April 11, 1961 E. ESTREMS 2,979,260
DATA TRANSFER SYSTEM
Filed Sept. 21, 1956 12 Sheets-Sheet 2

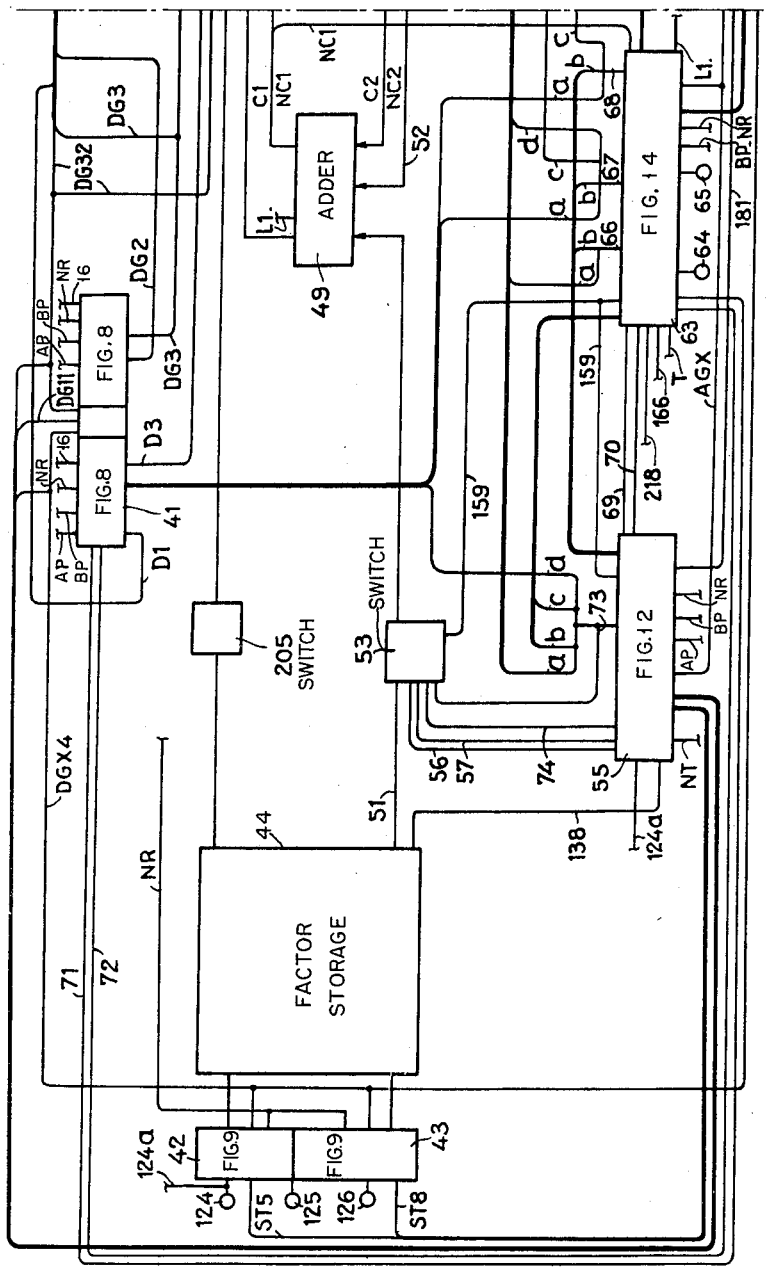

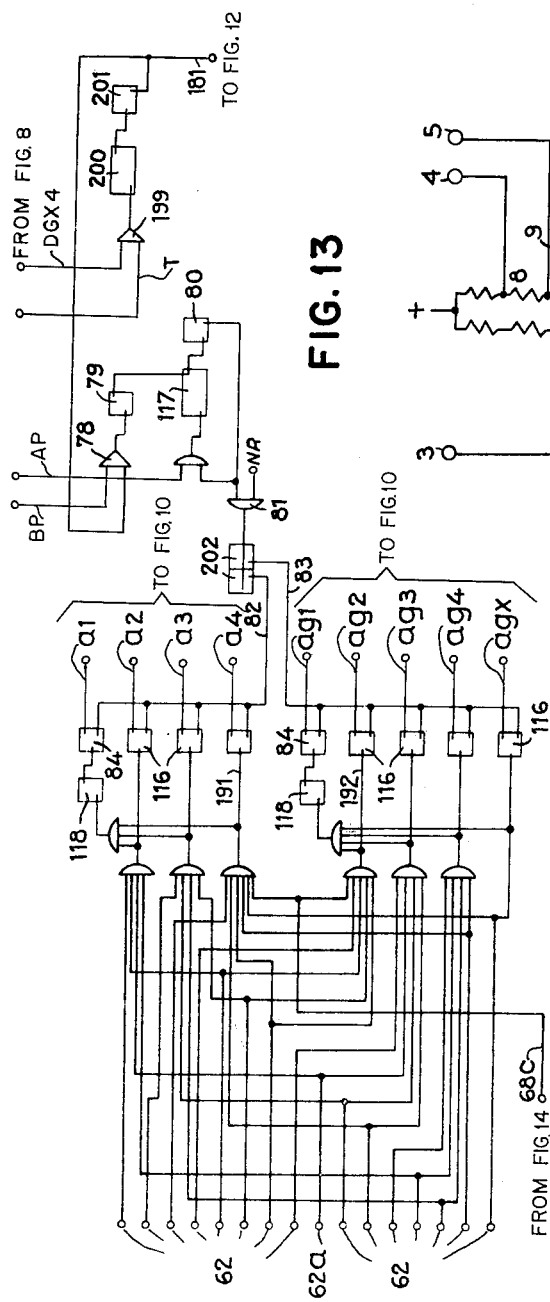
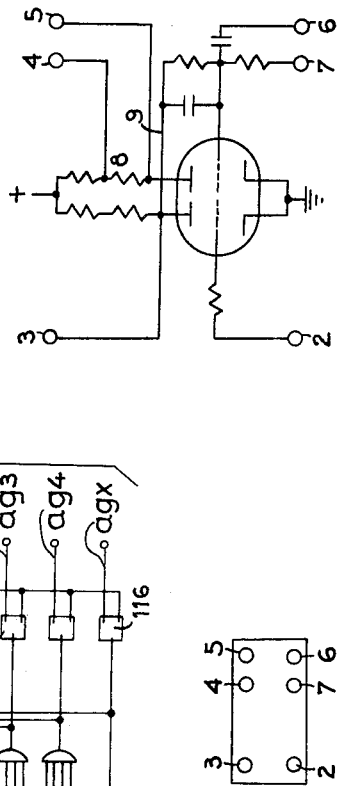

April 11, 1961 E. ESTREMS 2,979,260
DATA TRANSFER SYSTEM
Filed Sept. 21, 1956 12 Sheets-Sheet 4

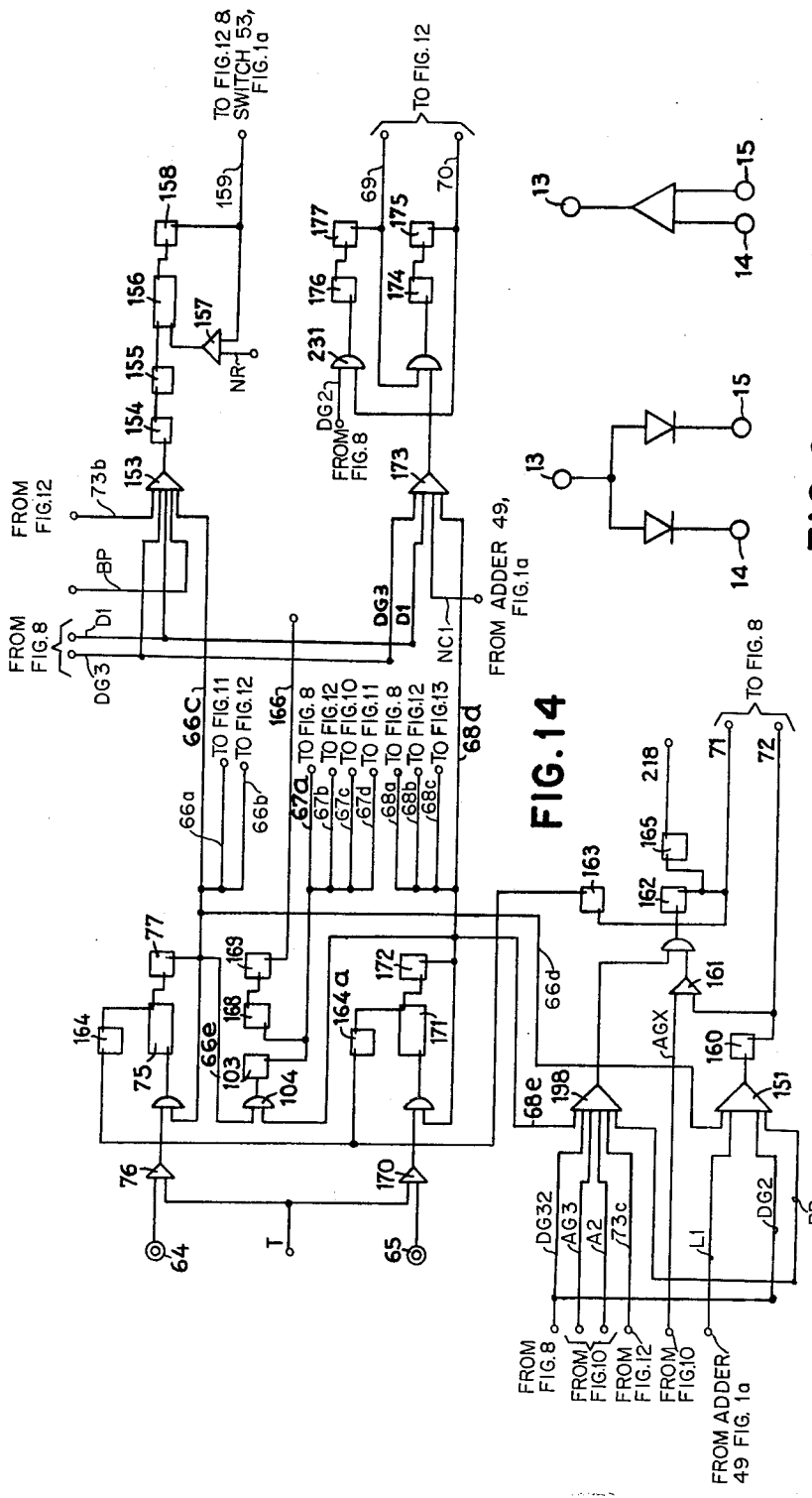

April 11, 1961  E. ESTREMS  2,979,260
DATA TRANSFER SYSTEM
Filed Sept. 21, 1956  12 Sheets-Sheet 6
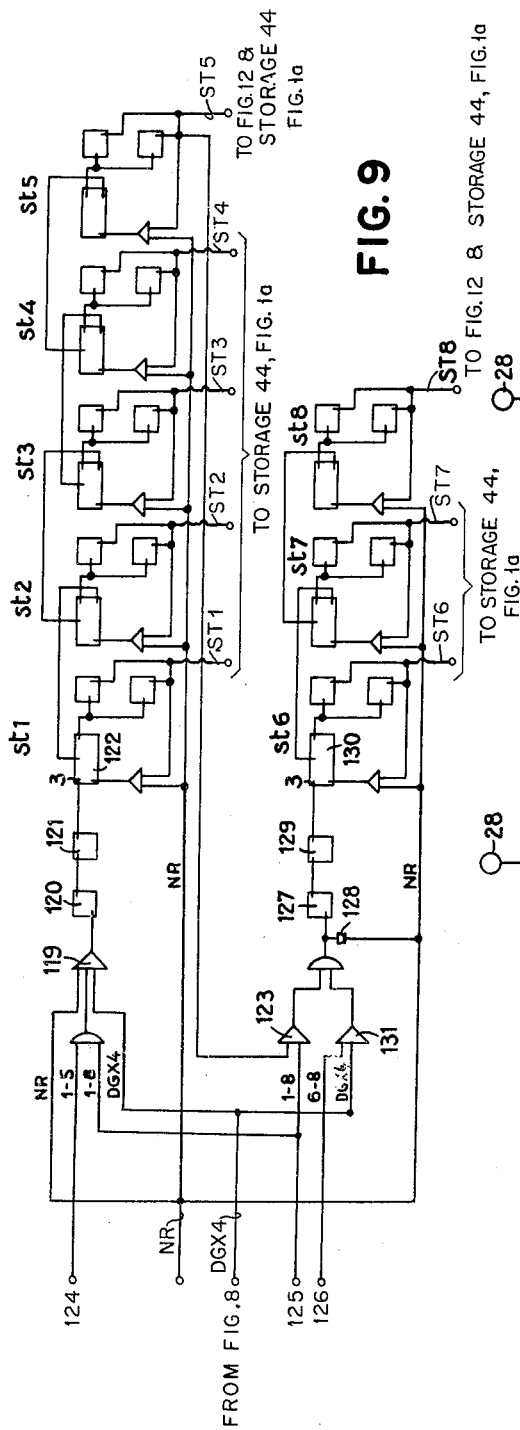

April 11, 1961  E. ESTREMS  2,979,260
DATA TRANSFER SYSTEM
Filed Sept. 21, 1956  12 Sheets-Sheet 8
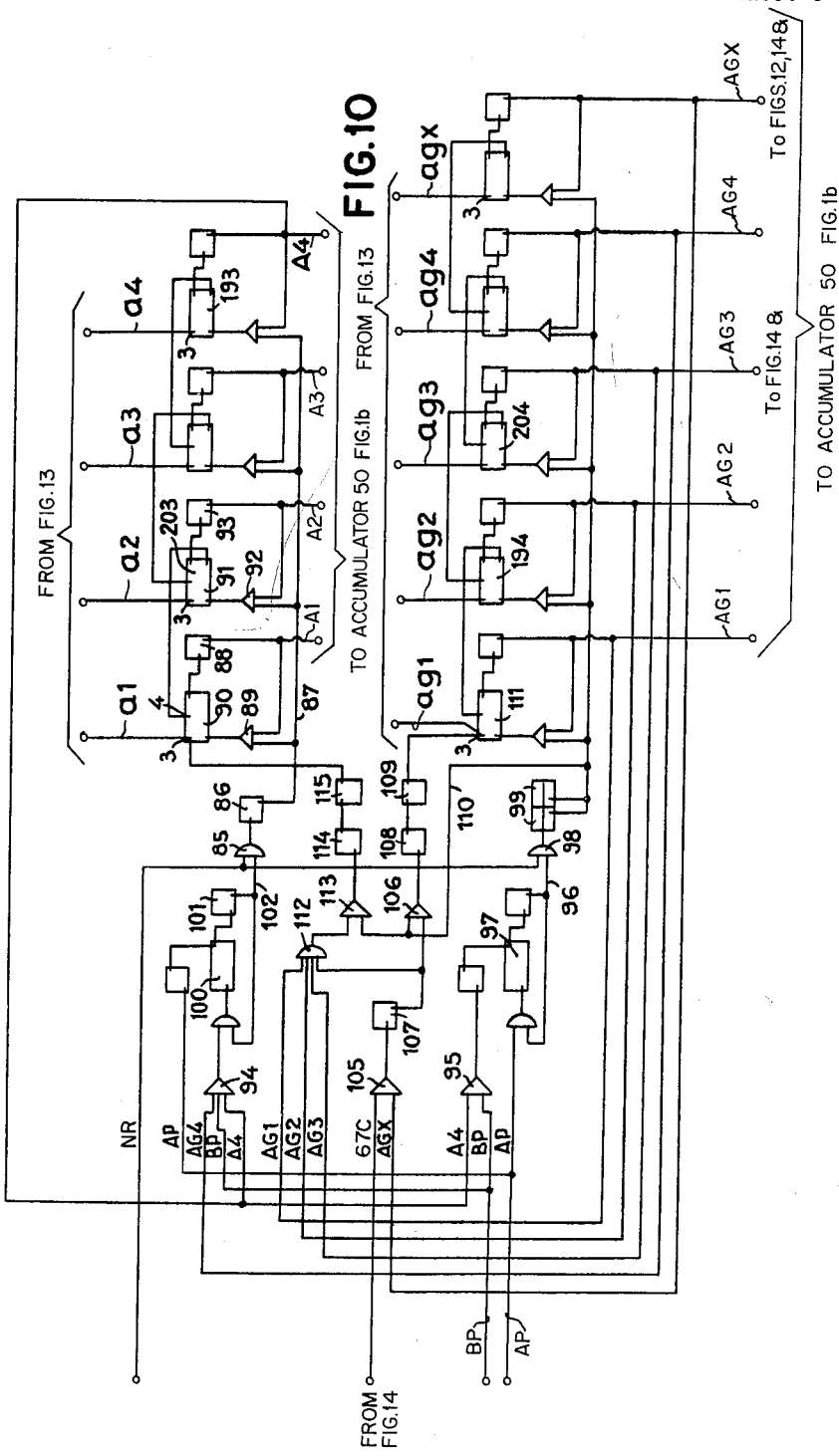

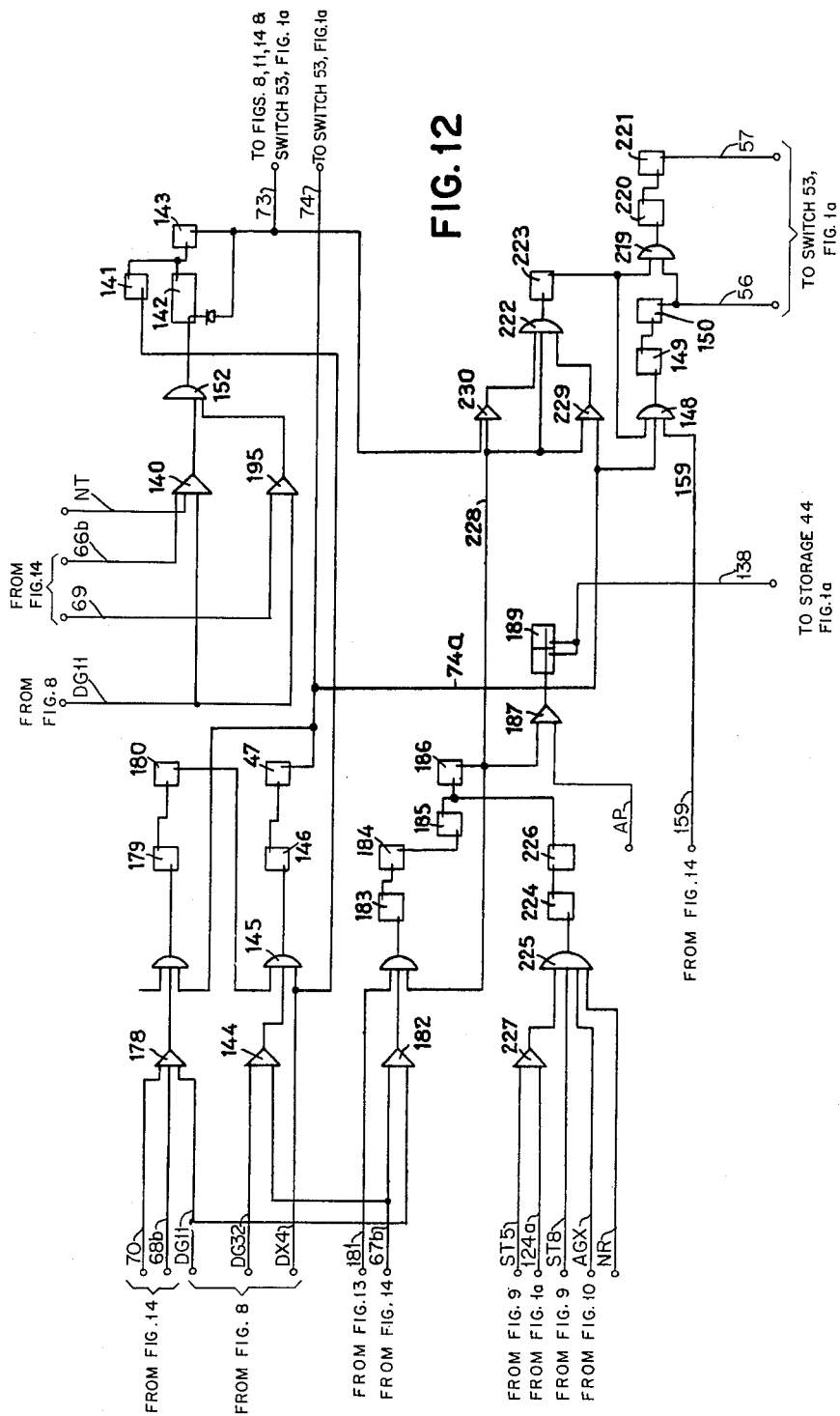

April 11, 1961                    E. ESTREMS                       2,979,260
                              DATA TRANSFER SYSTEM
Filed Sept. 21, 1956                                           12 Sheets-Sheet 10

FIG. 16b

# United States Patent Office 2,979,260
Patented Apr. 11, 1961

2,979,260
DATA TRANSFER SYSTEM

Eugeni Estrems, Saint-Mande, France, assignor to International Business Machines Corporation, New York, N.Y., a corporation of New York Filed Sept. 21, 1956, Ser. No. 611,272

15 Claims. (Cl. 235—159)

This invention relates to a data transfer system for use in a high-speed computer, and particularly to electronic circuits for automatically controlling successive transfer and shifting operations in such a computer that is capable of performing division and multiplication operations.

A major problem in high-speed computer construction is that of overcoming delays in the transfer and shifting of data between the various storage and adding circuits, particularly during multiplication and division operations. Associated with the problem of constructing ever faster computers and data processing systems is that of developing efficient and simple circuits that reduce the time for performing the arithmetic operations. It has been found that computers which operate in a serial manner reduce the number of circuits needed to perform successive transfers particularly in the case of multiplication. The serial-type computer may be generally identified by the simultaneous processing of the digits of two quantities by the same adding device in accordance with a particular sequence. However, special control devices have been required in order to set up and change these sequences automatically. For example, in the case of multiplication proper sequencing requires that the digit of a certain order in the partial product is made to correspond to the digit of the same order in the multiplicand. Thus after the digit of $p$ order in the unit partial product has been made to correspond to the digit of the same order in the multiplicand, it is then necessary to make the digit of the $p+1$ order in the partial product correspond to the digit of the $p$ order in the multiplicand. This is generally accomplished by directing the multiplicand into a delay line so that after the first operation, the unit digit is in the position formerly occupied by the tens digit. It is obvious that such a method reduces computer speed, since it requires the employment of delay circuits or lines.

Another method for controlling the sequential emission of order digits is that of the pulse distribution chains. However, the pulse distribution chains that are now employed also fail to develop automatically and without loss of time the desired sequencing, for example, between digit orders in the multiplicand and those in the partial products.

Therefore, the principal object of this invention is to provide an improved means for accomplishing the proper sequencing or transfer of digits during computer operations, particularly multiplication and division.

Another object of the invention is to provide an improved data transfer system in the form of flexibly controlled pulse distribution chains whose function is to arrange and accelerate transfer of digits between the registers and to reduce loss of time between successive transfers.

Another object of the invention is to provide an improved data transfer system for multiplication and division operations in which cycles of multiplication by zero or the emission of zeros at the start of a division are automatically canceled while factors and the result may be entered in predetermined positions of the registers.

Another object of the invention is to provide improved pulse distribution chains in which the number of pulses emitted by said chains during any operational cycle is controlled by the conditions within the computer.

Another object of the invention is to provide improved pulse distributing chains associated with two registers in which the number of pulses emitted by said chains is determined by one of said registers.

Another object of the invention is to provide flexibly operating pulse distribution chains in which any element of the chain may be operated to repeat any determined number of pulses and in which the chain elements may be skipped in order to reduce the final number of pulses emitted by the pulse distribution chain during any operation cycle.

Other objects of the invention will be pointed out in the following description and claims and illustrated in the accompanying drawings, which disclose, by way of examples, the principle of the invention and the best mode, which has been contemplated, of applying the principle.

In the drawings:

Figs. 1a and 1b illustrate a block diagram of the principal computer elements.

Fig. 3 illustrates a schematic of a double output inverter.

Fig. 3a is a block diagram of Fig. 3.

Fig. 6 illustrates a conventional AND circuit.

Fig. 6a illustrates a block diagram of Fig. 6.

Fig. 7 illustrates a conventional OR circuit.

Fig. 7a illustrates a block diagram of Fig. 7.

Fig. 9 illustrates a pulse distribution chain which serves to control the operation of the storage circuit.

Fig. 10 illustrates a pulse distribution chain which controls the operation of the accumulator.

Fig. 12 illustrates circuits that control the transfer of storage data.

Fig. 13 illustrates the circuits that control the accumulator pulse distribution chain.

Fig. 14 illustrates the circuits which control multiplication and division operations.

Fig. 15 illustrates a pulse timing diagram of transfer operations during a particular multiplication.

Figs. 16a and 16b illustrate a pulse timing diagram of transfer operations during a particular division operation.

*General description*

Figure 1B:
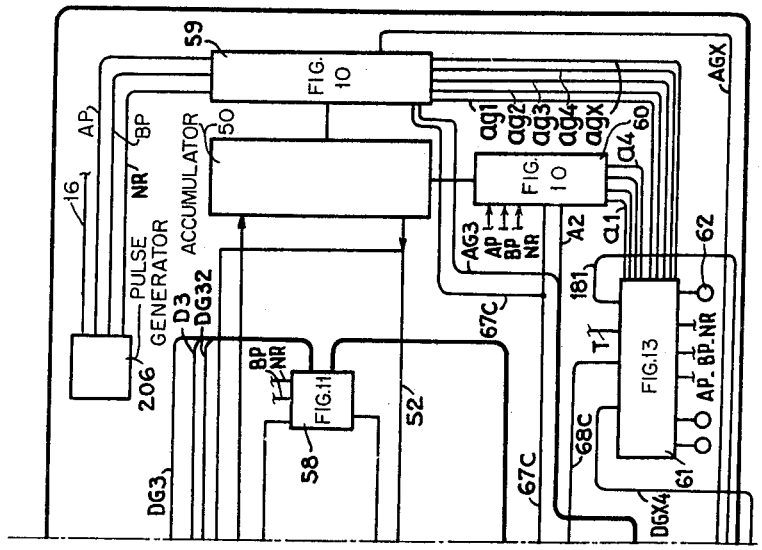

Figs. 1a and 1b illustrate the interrelationship between the various circuits constituting the invention and conventional circuits forming a high speed computing system. The present invention may be utilized with a computing system similar to that shown and described in copending application Serial No. 544,520 in the name of Hamilton et al., filed on November 2, 1955.

In Figs. 1a and 1b the storage unit 44 contains the divisor or multiplicand and the accumulator 50 contains the dividend or multiplier. Transfer of digits on line 51 from the storage unit to adder 49 is controlled by switch 53. Digits are delivered from accumulator 50 to adder 49 on line 52. Transfer from the accumulator 50 to storage unit 44 is controlled by a conventional switch 205. The output of adder 49 is transferred to accumulator 50.

Digit selection in storage unit 44 is accomplished by a pulse distribution chain (Fig. 9) comprising a five pulse chain group 42 and a three pulse chain group 43. Both chain groups are capable of being operated together to form a single eight pulse chain.

Whether the chain of Fig. 9 reads out three, five or eight digits from a particular location of storage unit 44 will be determined by a positive pulse on terminal 126, 124 or 125 respectively. The storage ring of Fig. 9 is reset by a positive pulse on line DGX4 from the primary ring of Fig. 8.

Digit selection in accumulator 50 is under the control of the pulse distribution chain of Fig. 10. This chain consists of two pulse chain groups 59 and 60, the former being identified as chain group $ag1-agx$ and the latter as chain group $a1-a4$. Operation of both chain groups is initiated by the circuits of Fig. 12 and maintained in operation by the pulses on lines AP, BP and NR provided by a conventional pulse generator 206. The simultaneous operation of the chain groups develops double pulse groups that operate, for example, different two-diode type coincidence circuits to produce sequential pulses for reading out digits from the accumulator 50. Such a coincidence type connection may be seen in Fig. 8.

The circuits of Fig. 13, reference 61 in Fig. 1b, control the starting of accumulator operation in accordance with signals received at input terminals 62. However, the signals are permitted to initiate the accumulator ring only when the primary ring of Fig. 8 delivers a positive pulse on line DGX4 during the initial period of computer operation when the circuits are being set up. At such time line T is assumed to be UP.

Figure 11:
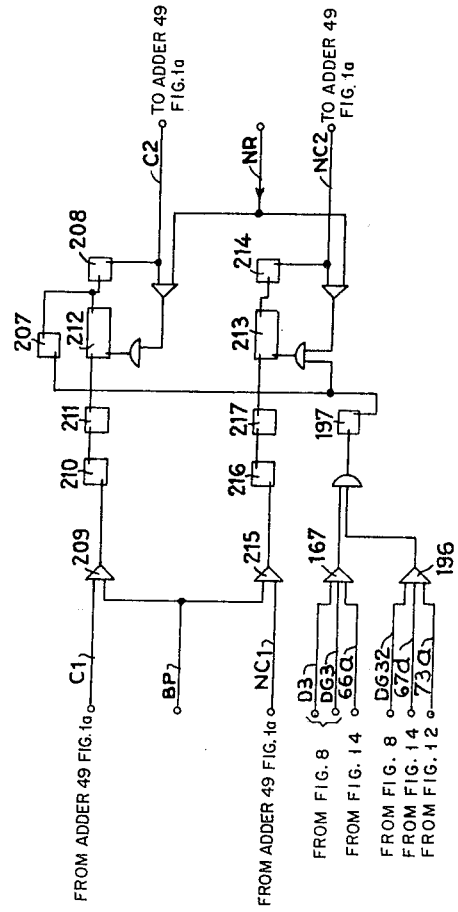
Fig. 11 illustrates the circuits that control the carry operation.

Carry control and suppression are provided by Fig. 11 (reference 58 in Fig. 1b). Such suppression occurs automatically during multiplication when positive pulses arrive on lines D3 and DG3 from the primary chain of Fig. 8 or when a positive pulse occurs on line DG32, as will be subsequently described in detail.

The circuits of Fig. 12 (reference 55 in Fig. 1a) provide control of readout from storage unit 44, and determine whether such readout shall be true (line 73 positive) or complementary (line 74 positive). The true-complementary circuit, controlled by pulses on lines 73 and 74, may take the form described in U.S. Patent No. 2,624,508. Line 56 controls the entry of a zero pulse into adder 49, and line 57 controls the entry of a nine pulse. Line 138 controls readout from storage unit 44 in accordance with pulses received from the primary ring of Fig. 8 and the storage ring of Fig. 9.

The circuits of Fig. 14 (reference 63 in Fig. 1a) control the division and multiplication operations of the computing system in accordance with pulses received at input hubs 64 (multiplication) and 65 (division). The signals developed by the circuits of Fig. 14 serve to control the operation of all the other transfer and shift circuits of Figs. 1a and 1b except the storage ring of Fig. 9. The circuits of Fig. 14 also sense the end of division and multiplication, providing positive pulses on lines 166 and 218 which may be used to commence the next operation cycle.

Figure 8:
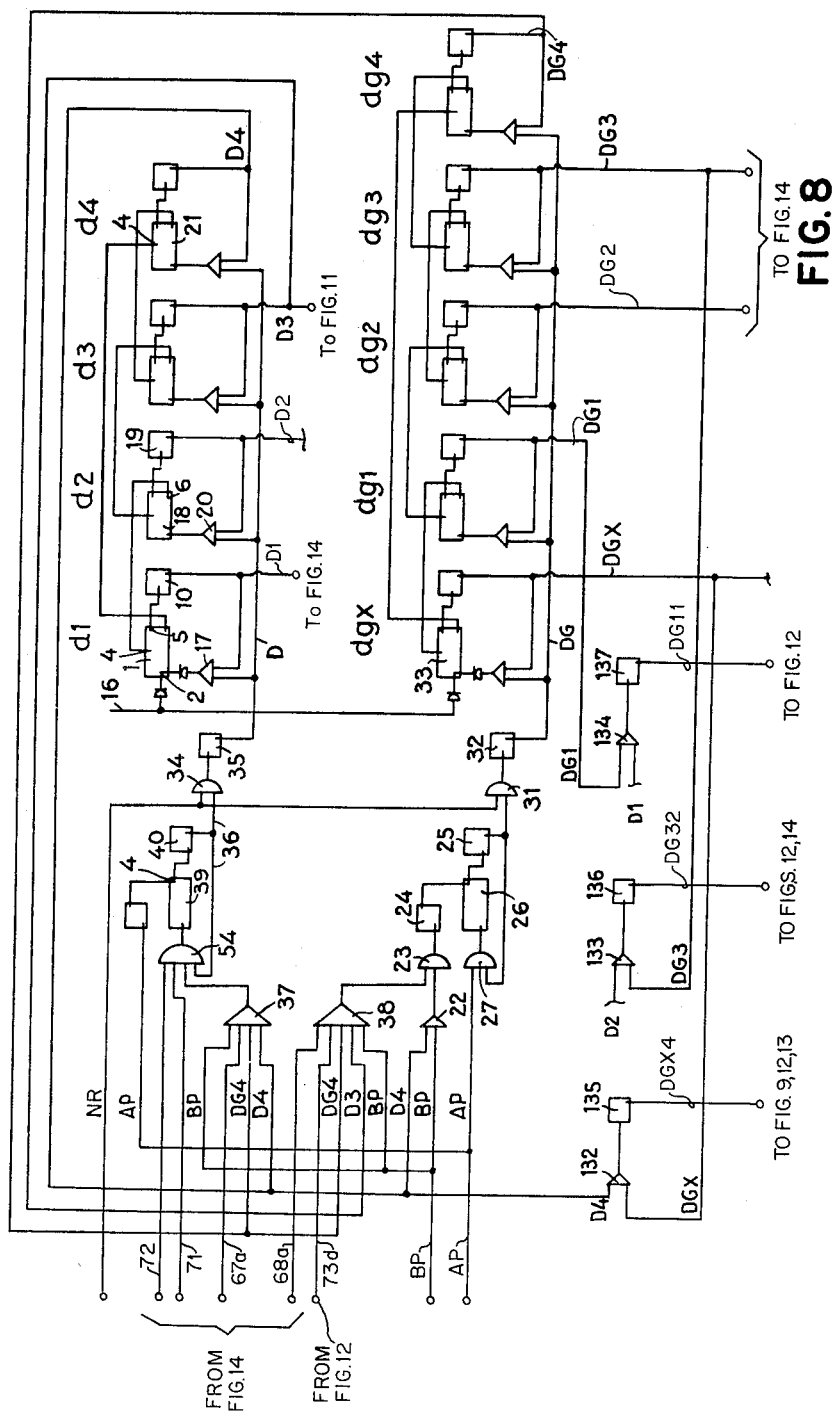
Fig. 8 illustrates a pulse distribution chain which serves as a primary or digit ring.

Ultimate control and synchronization of the shift and transfer operation in the disclosed computing system is provided by the pulse distribution chain of Fig. 8 comprising the $d1-d4$ chain group and the $dgx-dg4$ chain group. The primary ring of Fig. 8 is started by a positive pulse on line 16 and stepped along by the negative pulse on line NR. In accordance with input conditions, this chain may develop any number of control pulses.

The primary ring of Fig. 8 may be termed the master ring, and the storage ring of Fig. 9 and the accumulator ring of Fig. 10 may be termed the slave rings. The pulse developed by the primary ring on line DGX4 initiates or resets the storage and accumulator rings. When the transfer of digits between storage unit 44 and accumulator 50 is made units into units, tens into tens, etc., the storage and accumulator rings are started in phase. If the operation requires an initial shift, the accumulator ring is started in the middle so that several of the accumulator positions are not scanned. After the storage and accumulator rings are started, the phase relationship between the rings and therefore shifting in the computer is controlled by the primary ring.

*Basic circuits*

The basic circuits are conventional in nature, and therefore only a brief statement is given in explanation of them.

The first of these basic circuits is illustrated in Figs. 3 and 3a, with the latter merely being a block diagram of the former. The double output inverter of Fig. 3 comprises a duo-triode, the left hand grid of which is connected through a resistor to input terminal 2. When the double inverter is operated from the left side by the application of a positive voltage at input terminal 2, output terminal 3 goes down in potential due to the flow of current through the plate resistors connected to the positive line. At the same time output terminals 4 and 5 have an increased potential because the right-hand triode of the duo-triode combination is not conducting at this time. The reduced potential at the left-hand plate is transmitted through a resistor-capacitor network to the right-hand grid, thereby preventing the right-hand triode from conducting.

The application of a negative pulse at input terminal 2, has the reverse effect on this inverter, since it makes the left-hand triode non-conductive and the right-hand triode conductive. Similarly, the application of a positive potential at input terminal 6 or 7 makes the right-hand triode conductive and the left-hand triode non-conductive as explained. It is thus possible to control the output condition of this inverter by the application of suitable input voltages at more than one input terminal. In the block diagram of Fig. 3a the input terminals are illustrated in the lower area and the output terminals in the upper area. These terminals will assume their respective relation when the block diagram of the double inverter is shown and described throughout the succeeding circuits.

Figure 4:
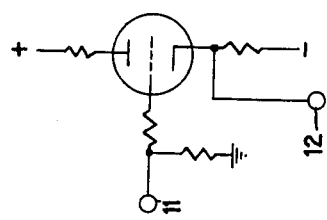
Fig. 4 is a schematic of a conventional method follower.
Figure 4A:
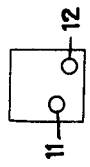
Fig. 4a is a block diagram of Fig. 4.

Figs. 4 and 4a illustrate a conventional cathode follower. As shown in Fig. 4, a positive potential applied at input terminal 11 makes the triode conductive and current to flow in the cathode resistor, in this way developing a positive potential at output terminal 12. Fig. 4a illustrates the same circuit in block form, and the relative positions of input terminal 11 and output terminal 12 will remain the same whenever the cathode follower block diagram is shown in succeeding circuits.

Figure 5:
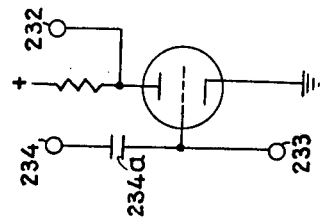
Fig. 5 is a schematic diagram of a conventional single output inverter.
Figure 5A:
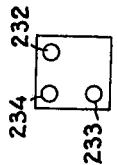
Fig. 5a is a block diagram of Fig. 5.

Figs. 5 and 5a illustrate a conventional single output inverter. In Fig. 5 a positive pulse applied at either input terminal 233 or input terminal 234 makes the triode conductive causing current to flow through the plate resistor and developing thereby a reduced potential at output terminal 232. Similarly an absence of a positive voltage at either input terminal will not make the tube conductive and will cause output terminal 232 to have a higher potential. A positive pulse at input terminal 234 is made available to the control grid of the triode through a capacitor 234a. The block diagram of this inverter is illustrated in Fig. 5a which shows input terminals 233 and 234 and output terminal 232 in the relative positions that they will maintain whenever this inverter block diagram is employed in succeeding circuits.

Figs. 6 and 6a illustrate a conventional AND circuit which operates in a manner to develop an increased potential at output terminal 13 whenever positive voltages are applied simultaneously at input terminals 14 and 15. The circuit of Fig. 6 will be illustrated as shown in Fig. 6a whenever an AND circuit is shown in the succeeding circuits.

Figs. 7 and 7a illustrate a conventional OR circuit. The application of a positive potential at either or both input terminals 29 or 30 will bring about an increased potential at output terminal 28. Fig. 7a is employed to illustrate the two-input OR circuits of Fig. 7 in succeeding circuit diagrams.

*The transfer and shift circuits*

The basic components of Figs. 3–7 are shown interconnected in Fig. 8 to form a pulse distribution chain having two pulse developing groups. One such group is composed of four latch circuits $d1$, $d2$, $d3$ and $d4$. The other group is made up of five latch circuits $dgx$, $dg1$, $dg2$, $dg3$ and $dg4$. Each latch circuit in the two pulse developing groups is composed of a double position inverter (Fig. 3), cathode follower (Fig. 4) and an AND circuit (Fig. 6). In the initial pre-operating condition the left triode of each double inverter is non-conductive and the right triode is conductive.

Referring to latch $d1$, a positive pulse (for example, 40 volts) applied to line 16 is gated by a diode to input terminal 2 of the double inverter (Fig. 3) which causes said inverter to develop a positive potential at its output terminal 5. This developed potential then operates cathode follower 10 and makes a positive potential available to the right diode of AND circuit 17. If at this time a positive potential is present on line D, AND circuit 17 delivers a positive signal through a diode to input terminal 2. So long as a positive voltage of sufficient magnitude is present on line D, latch $d1$ will form a closed loop and a positive signal will be available on output line D1. Of course, when no positive voltage is applied originally on line 16, the latch in stage $d1$ will not be developed inasmuch as output terminal 5 is negative at this time. In the subsequent discussion each conductive line or terminal will be said to be UP when a positive potential exists, and DOWN when a negative potential exists.

At the time that latch $d1$ is energized, output terminal 4 of inverter 1 (Fig. 3) is also in the UP condition, thereby applying a positive potential to input terminal 6 of the double inverter 18. This positive voltage makes the right triode of the double inverter 18 conductive thereby preventing cathode follower 19 from being conductive and latch $d2$ from being energized. Thus a pulse cannot be developed on output line D2 at this time. Output latches $d3$ and $d4$ also cannot develop an output pulse at this time. In the case of latch $d3$ the positive potential made available to the right inverter by the inoperative condition of the left inverter maintains the right inverter in a state of conduction regardless of the DOWN condition of output terminal 4 of double inverter 18 in latch $d2''$.

To bring about the energization of the next succeeding stage or latch it is only necessary to develop a negative pulse on line D. Assuming that latch $d1$ is in an energized condition, the application of a negative pulse on line D causes input terminal 2 of the double inverter 1 to go DOWN and output terminal 4 to go DOWN also. The negative swing of terminal 4 makes input terminal 6 of two-position inverter 18 of latch $d2$ sufficiently negative, thereby causing a positive pulse to be applied to cathode follower 19. The positive pulse developed by cathode follower 19 is sent to AND circuit 20, which also receives a positive pulse from line D at this time. Thus stage $d2$ is energized, and a positive pulse is made available for succeeding circuits on line D2.

Latches $d3$ and $d4$ are operated sequentially in response to negative voltages developed on control line D in a manner similar to that already described with regard to latches $d1$ and $d2$. However, latches $d3$ and $d4$ also develop output signals that serve to control the operation of the pulse-developing group $dgx$, $dg1$, $dg2$, $dg3$ and $dg4$.

Latches $dgx$, $dg1$–$dg4$ are identical in operation and structure to latches $d1$–$d4$. As in the case of latch $d1$ latch $dgx$ is also initially energized by the application of a positive potential on line 16. This voltage is delivered through a diode to the input terminal of the double inverter 33 which operates in the manner already described with regard to inverter 1 of latch $d1$. Once latch $dgx$ is energized, the stepping of the pulse group formed by this latch and latches $dg1$–$dg4$ is controlled by the negative pulse developed on line DG in a manner similar to that of control line D described above. The pulses developed by the pulse generating group $dgx$, $dg1$–$dg4$ are delivered to various circuits of the computer and to the input circuits of the pulse distributing chain of Fig. 8.

It has been stated that the operation of the two pulse distributing groups $d1$–$d4$ and $dgx$, $dg1$–$dg4$ is controlled by the negative potential applied at input terminals D and DG respectively. In the case of pulse distributing group $d1$–$d4$, this means that the latches are operated sequentially whenever cathode follower 35 is non-conductive. This condition occurs whenever OR circuit 34 has not been made operative by a positive pulse developed on line 36 by the latch circuit composing double inverter 39, cathode follower 40 and input OR circuit 54. This latch circuit may be energized in a number of ways. A positive pulse received on line 71 or 72 from the circuits of Fig. 14 will operate OR circuit 54 and therefore provide a positive condition at the input of the double inverter 39. Output terminal 4 will thus go UP making cathode follower 40 operative to raise line 36 UP.

The latch may also be operated through AND circuit 37. In that case pulses must arrive simultaneously on line D4 from latch $d4$, line DG4 from latch $dg4$, line 67a from Fig. 14 and on line BP from the pulse generator 206 of Fig. 1b. AND circuit 37 is thereby capable of energizing the control latch for group $d1$–$d4$. The control latch may be de-energized by a positive pulse on line AP, which pulse is inverted and applied to terminal 4 of double inverter 39. Cathode follower 40 is made inoperative, and the negative pulse on line NR brings control line D DOWN to step along the pulse group $d1$–$d4$.

A similar input control system is provided for pulse distributing group $dgx$, $dg1$–$dg4$. Control line DG is DOWN whenever cathode follower 32 is caused to be non-conductive by the absence of a positive pulse at the input of cathode follower 41. The latter condition occurs when the latch, comprising double inverter 26, cathode follower 25 and OR circuit 27, is in its de-energized condition. The DG control latch is identical to the D control latch.

This latch may be energized in a number of different ways. An AP signal made available at the upper input terminal of OR circuit 27 will energize the DG control latch. The latch may be de-energized through the operation of inverter 24. Operation of OR circuit 23 is controlled by AND circuits 38 and 22. For operating AND circuit 38, it is necessary that positive pulses be applied simultaneously on line DG4 from latch $dg4$, line D3 from latch $d3$, line 68a from Fig. 14, line 73d from Fig. 12 and a positive pulse on line BP. AND circuit 22 can only be operated when positive pulses are applied simultaneously on lines D4 and BP. The sequence and relative time orders in which these two input control circuits are operated for controlling the operation of the two pulse distributing groups will be discussed subsequently, when the logic of the data transfer system is taken up in greater detail. It is sufficient to state at this time that the pulse distributing chain of Fig. 8 is capable of developing twenty pulses during any operation cycle or another number of pulses in accordance with computer conditions. Reference to Fig. 8 will show additional circuits for developing pulses at other than the regular time intervals. For example, in the left bottom corner of Fig. 8 is shown AND circuit 132 and cathode follower 135 which operate to develop a positive pulse on line DGX4 only when positive pulses are developed simultaneously by latch $d4$ and latch $dgx$. Similarly, AND circuit 133 and cathode follower 136 develop a positive pulse on line DG32 whenever latches $d2$ and $dg3$ develop positive pulses simultaneously. This also applies to AND circuit 134 and cathode follower 137 which develop a positive pulse on line DG11 whenever latches $d1$ and $dg1$ are operating simultaneously.

It should be understood that references such as DGX4, DG32 and DG11 are intended to indicate a particular conductive line and also the relative time interval in which a positive pulse appears on said line. That is to say, DGX4 indicates that both a D4 pulse and a DGX pulse have joined together to form the DGX4 pulse. Similarly the reference DG32 indicates that the DG3 pulse and the D2 pulse form the DG32 pulse. This identification of pulses should be clearly understood inasmuch as it is found in the description of the logic that follows.

The two pulse generating groups are initially operated simultaneously since the positive pulse on input line 16 is fed simultaneously to double inverter 1 and 33. In the original reset condition, latches $d1$ and $dgx$ are energized to develop separate pulses on lines D1 and DGX at what may be considered to be time interval DGX1. Thereafter, the upper and lower chain groups are stepped along by negative pulses on line NR.

For example, the first negative NR pulse after reset de-energizes latch $d1$ and energizes latch $d2$. Latch $dgx$ is not de-energized because negative signal NR is not permitted to go through OR circuit 31 except when the upper chain group reaches stage $d4$ or the stages $d3$ and $d4$ are energized simultaneously. Therefore, at this time interval, that is DGX2, output lines DGX and D2 are UP. The lower chain will continue to develop a positive pulse on line DGX until the upper chain group reaches stage $d4$, at which time OR circuit 31 will allow negative pulse NR to de-energize latch $dgx$ and energize latch $dg1$.

Both chain groups are capable of automatically resetting themselves after their last stages $d4$ and $dg4$ have been energized, unless of course the conditions in the computer require that a greater or lesser number of points than 20 be developed for a particular operating cycle.

Assume that it is desired to reduce the number of pulses developed by the primary chain of Fig. 8, and the desired number is 17, as shown below.

DG: 1 : 2 : 3 : 4 :X

D :1 2 3 4:1 2 3 4:1 2 3 4:1 2 3 4: 4

The sequence continues normally until time interval DG44, after the 16th pulse. The pulse counting is said to begin at time interval DG11 and to end at time interval DGX4. At time interval DG44, AND circuit 37 is operated, energizing the upper group control latch, comprising OR circuit 54, inverter 39 and cathode follower 40. This prevents the upper chain from being stepped along from stage $d4$ to stage $d1$. However, the lower chain is permitted to be stepped along from stage $dg4$ to $dgx$. Thus pulses DGX1, DGX2 and DGX3 are suppressed, and only 17 pulses are counted.

The primary chain may be reduced to 16 pulses as follows:

DG: 1    2    3    4  X   1

D :1 2 3 4:1 2 3 4:1 2 3 4:1 2 3:4 :1 2 3 4

At the end of time interval DG43 or the 15th pulse, AND circuit 38 is operated to de-energize the lower group control latch, comprising OR circuit 27, inverter 26 and cathode follower 25, thereby permitting the negative NR pulse to step the lower group from stage $dg4$ to $dgx$. Since the upper group is not disturbed at this time, it moves normally from stage $d3$ to stage $d4$.

It must be understood that other similar input control circuits may be employed to reduce the primary chart of Fig. 8 to any number of pulses.

Similarly, the primary chain may have the number of its pulses increased any amount. This is accomplished by maintaining the upper chain group in a selected position for any length of time. In such a case it is necessary to maintain the upper group control latch in an energized condition for a sufficiently long time interval. A continuing positive pulse on either input line 71 or 72 can maintain this latch energized indefinitely. Assuming that either input line 71 or 72 is caused to be UP at time interval DG32, the primary chain of Fig. 8 will continue developing $dg32$ pulses until that input line goes DOWN, at which time the upper and lower chains will continue their normal operation.

Figure 2:
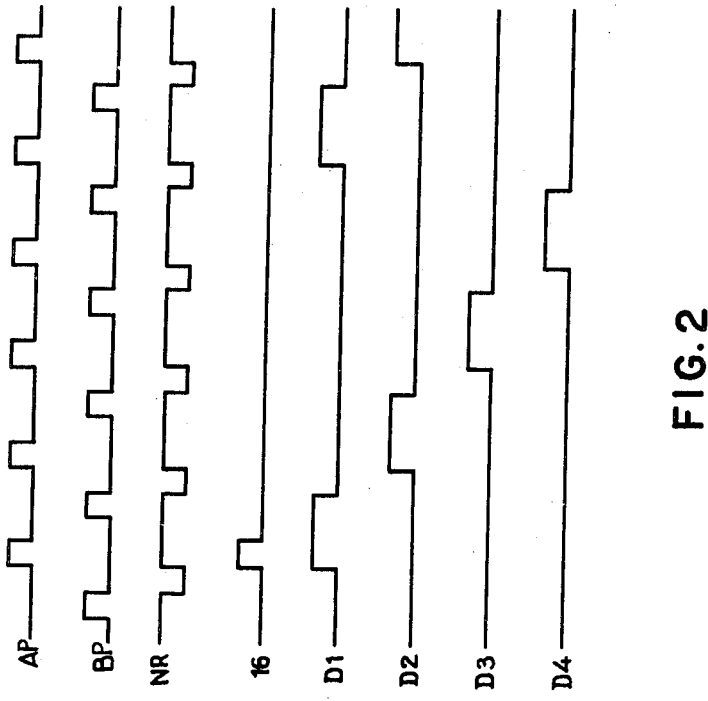
Fig. 2 illustrates a time chart of the main pulses that control the computer of Figs. 1a and 1b.

Reference to Fig. 2 will illustrate the primary pulses which were discussed with regard to Fig. 8. Each of the pulse identifications, for example, AP, BP, NR, etc. will be shown in the described circuits beside the conductive line which carries the pulse. In other words and referring specifically to Fig. 8, pulse AP is shown adjacent the line that feeds OR circuit 27, pulse BP is shown adjacent the line that feeds AND circuit 22, etc. A single pulse is shown simply because only one such pulse is necessary to initiate the operation of the primary chain after which control of the operation of this chain is assumed by the input control circuits. Fig. 2 illustrates the relative timing and relationship of the primary pulses. The pulses AP, BP, NR and 16 are developed by any conventional pulse generating device 206 (Fig. 1b). Pulses $d1$–$d4$ are developed by the upper pulse distributing group of Fig. 8.

Fig. 9 illustrates the storage ring which comprises eight latches $st1$–$st8$ that are similar to the latches discussed with regard to Fig. 8. However, in the latch of Fig. 9 two cathode followers are connected in parallel between the output of each double inverter and its input AND circuit. The storage ring is actually an open ring which is composed of a ring of five and a ring of three, the two of which may be operated together to form a ring of eight.

The operation of the storage ring of Fig. 9 is initiated or reset by the presence of a coincidence at AND circuit 119. This occurs when input lines NR, DGX4, and either input terminal 124 or 125 are UP. In such a situation, AND circuit 19 is conductive and the input of inverter 120 is UP. This causes the input of inverter 121 to be DOWN and input terminal 3 of inverter 122 to be UP. Reference to Fig. 3 shows that when input terminal 3 is UP, the left triode is made conductive, thereby causing output terminals 4 and 5 of inverter 122 to be UP. With output terminal 5 of inverter 122 in the UP condition, the two cathode followers in stage $st1$ are made conductive and develop a positive pulse on output line ST1. Simultaneously, a positive pulse is delivered to the right diode of the input AND circuit in stage $st1$. So long as line NR is UP, the input AND circuit develops an UP condition at the control grid of the left triode of inverter 122, maintaining stage ST1 in a closed loop. All other stages of the storage ring are inoperative at this time. Each succeeding negative signal on line NR causes the ring to be stepped along in a manner already explained with regard to Fig. 8.

It has been stated that the storage ring of Fig. 9 is capable of developing groups of three pulses, five pulses, or eight pulses. The three pulse chain is developed by the presence of a positive pulse at input terminal 126 at the same time that a positive pulse occurs on line DGX4 from the primary ring of Fig. 8. These simultaneous pulses operate AND circuit 131 and through an OR circuit make inverter 127 conductive and inverter 129 non-conductive. Input terminal 3 of inverter 130 is therefore caused to be UP and operation of the three pulse chain ST6–ST8 is initiated. Subsequent entry of negative pulses on line NR steps this chain along so that the output pulses are successively developed at outputt erminals ST6, ST7 and ST8. At the end of the third pulse operation of this chain must be again initiated by positive pulses applied at input terminal 126 and on line DGX4.

The five pulse chain is initiated by the presence simultaneously of positive voltages at input terminal 124 and lines NR and DGX4. In such a case AND circuit 119 makes inverter 120 conductive and inverter 121 non-conductive. The positive condition at input terminal 3 of inverter 122 of stage ST1 initiates the five pulse chain ST1–ST5. In the manner previously explained successive entries of negative pulses on line NR, steps the chain along to provide positive pulses at output terminals ST1–ST5. At the end of the fifth pulse, the chain is stopped and is revived by the simultaneous application of positive voltages at the input of AND circuit 119.

The eight pulse chain includes the three and five pulse chains mentioned above. This chain is initiated as stated above in the case of the 5 pulse chain ST1–ST5 with the exception that a positive voltage is impressed at input terminal 125 rather than at input terminal 124. This voltage permits AND circuit 119 to be operated for the purpose of starting chain operation. Upon the operation of stage ST5 a positive voltage developed by this stage is delivered to the AND circuit 123 at the same time that a positive voltage is made available to this AND circuit from input terminal 125. Operation of AND circuit 123 provides a positive voltage through an OR circuit to inverter 127 for the purpose of continuing the count through the three stages ST6–ST8.

Fig. 10 illustrates an accumulator ring having two pulse chain groups that are similar to the pulse chain groups discussed in the case of Fig. 8. The upper group $a1$–$a4$ and the lower group $ag1$–$agx$ are initiated by positive voltages applied at two of the input lines from the control circuit of Fig. 13. Assuming that a positive voltage is applied on line $a1$, inverter 90 operates in a manner to drive cathode follower 88 into a state of conduction developing a positive pulse on output line A1 and operating AND circuit 89 in conjunction with the positive voltage on control line 87. Once initiated the chain is then stepped along by negative pulses applied on line NR through OR circuit 85 and cathode follower 86 to line 87.

The advance of pulse group $a1$–$a4$ may be stopped by the development of a positive pulse by AND circuit 94 when stages A4 and AG4 in Fig. 10, as well as line BP, deliver positive voltages. The UP condition at the input of AND circuit 94 is transmitted through an OR circuit to the input of inverter 100, which drives cathode follower 101 into a state of conduction, and causes line 102 to be UP also. This condition is reflected in line 87 which prevents negative pulses available on line NR to step the chain along. Generally the negative voltage on line NR is permited to step along chain $a1$–$a4$ because line 102 is DOWN. The positive voltage on line AP is converted into a negative condition at the input of cathode follower 101 through an inverter. With a DOWN condition at the input of the bottom diode of OR circuit 85, the negative pulse available on line NR is permitted to be delivered to line 87 for the purpose of stepping chain group $a1$–$a4$.

Chain group $a1$–$a4$ is reset by the presence simultaneously of two positive signals at the input of AND circuit 113. The upper diode of AND circuit 113 is controlled by voltages provided by OR circuit 112, which is operative whenever stages $ag1$, $ag2$ or $ag2$ develop a positive pulse or when positive voltages exist on lines 67C and AGX simultaneously. In the latter case, AND circuit 105 is operated making cathode follower 107 conductive and developing a positive voltage on the lowermost diode of OR circuit 112.

The lower diode of AND circuit 113 is positive whenever parallel connecting cathode followers 99 are conductive. This occurs whenever line AP is UP. In such a case, the output of double inverter 97 is also UP and line 96 of the latch circuit, which the inverter 97 forms a part, is also UP. The positive voltage on line 96 is delivered by OR circuit 98 to the control grids of cathode followers 99, making the latter conductive. With both inputs of AND circuit 113 UP, the output of inverter 114 is DOWN and the output of inverter 115 is UP. This has the effect of resetting chain $a1$–$a4$.

Lower chain group $ag1$–$agx$ is initiated or reset by a positive pulse provided at input terminal 3 of inverter 111 of stage $ag1$. The lower chain group is initially started by a positive pulse on input line $ag1$ from the circuit of Fig. 13. Upon completion of the first full cycle of operation a positive pulse is developed on line A4 which together with a BP pulse operates AND circuit 95. With the output of AND circuit 95 UP, the output of the succeeding inverter is therefore DOWN and line 96 is also DOWN. This permits the negative pulse on line NR to be delivered through OR circuit 98 and cathode followers 99 to the control line of group $ag1$–$agx$ for the purpose of moving the chain along.

The upper and lower chain groups of Fig. 10 may be started in any sequence since all the stages are independently controlled by pulses provided by the circuit of Fig. 13. However an upper stage is operated simultaneously with a lower stage, as in the case of the primary ring of Fig. 8.

Stage $ag1$ will continue to produce a positive pulse on its output line AG1 during the time that chain group $a1$–$a4$ produces positive pulses sequentially on its output lines $a1$–$a4$. However, when stage $a4$ develops an output pulse on its output line $a4$, AND circuit 95 is operated for the purpose of permitting the negative pulse on line NR to step the lower chain group to stage $ag2$. It should be noted that group $a1$–$a4$ is stopped whenever stage $ag4$ develops a positive pulse because an $ag4$ pulse is not delivered to OR circuit 112 but instead is made available to AND circuit 94. The presence of positive pulses on lines AG4, A4 and BP at the input of circuit 94 makes line 102 go UP to prevent the negative pulses on line NR from reaching line 87 for the purpose of stepping along chain A1–A4 at the time the lower chain is in stage AGX.

The ability of stage $ag4$ to prevent the stepping along of the upper chain group at the time that stage A4 of the upper group is energized enables the accumulator ring of Fig. 10 to develop a 17 point operation cycle in accordance with the following tabulation:

AG: 1 : 2 : 3 : 4 : X

A : 1 2 3 4 : 1 2 3 4 : 1 2 3 4 : 1 2 3 4 : 4

After the positive pulse on line A4 and the positive pulse on line BP operate AND circuit 95 for the purpose of allowing the negative pulse on line NR to step the lower group from stage $ag3$ to $ag4$, the positive pulse developed by stage $ag4$ prevents $a4$ of the upper group from returning to stage $a1$. Line A4 remains UP at the time line AG4 is brought UP to operate AND circuit 94 and thereupon prevent negative pulse NR from resetting the upper chain group. Resetting is accomplished at time interval AGX4.

The chain of 17 pulses which the accumulator ring of Fig. 10 is capable of producing controls the readin and readout of 17 digits into and out of accumulator 50 (Fig. 1b). It is understood that pairs of said A and AG pulses are gated through individual coincidence circuits in the manner shown in Fig. 8 before operating the digit order pentodes primed by the storage triggers in each order of the accumulator. It will be noted that other pulses developed by the accumulator ring serve to control the circuits of Figs. 12 and 14.

Fig. 11 illustrates the circuits which develop carry and no carry signals for the computing system illustrated in Figs. 1a and 1b, and assigned reference numeral 58 in Fig. 1b. Generally Fig. 11 comprises input coincidence circuits which operate a pair of parallel latches. A carry signal from adder 49 (Fig. 1a) on line C1 at the time that input line BP is UP operates AND circuit 209 bringing about a DOWN condition at the output of inverter 210 and an UP condition at the output of inverter 211. This results in the operation of double inverter 212 and cathode follower 208, which forms a part of the carry control latch, and causes output line C2 to be UP. The positive signal on line C2 designates a carry for adder 49 in Fig. 1a.

In the case where there is an absence of a carry in adder 49 of Fig. 1a, input line NC1 is UP, and if line BP is UP simultaneously, AND circuit 215 is operated. When the output of AND circuit 215 is UP, the output of inverter 216 is DOWN and the output of inverter 217 is UP.

The no carry control latch, comprising double inverter 213 and cathode follower 214, is operated in a manner to cause output line NC2 to be UP. This latch is maintained energized by the positive potential on line NR.

Suppression of a carry signal received on line C1 from adder 49 is accomplished at two different time intervals. For example, it is desirable to suppress the carry at the time of the addition of a digit 9 and an order digit of accumulator 50 when the multiplier is reduced by 1. In such a case, AND circuit 167 is operated by positive pulses on lines D3, DG3 and 66A. With the output of AND circuit 167 UP, the output of cathode follower 197 is also UP causing the output of inverter 207 to go DOWN. Cathode follower 208 then reflects the DOWN condition on output line C2, thereby conveying to adder 49 of Fig. 1a the information that the carry is suppressed.

Similarly, the carry is suppressed whenever the transfer of a true value of the number in storage unit 44 to adder 49 is stopped. Such suppression occurs at the time intervals at which a positive pulse is formed on line DG32. The presence of this pulse at the same time that input lines 67D and 73A are UP, operates AND circuit 196 which makes cathode follower 197 conductive. As explained above, the operation of cathode follower 197 brings about a negative or DOWN condition on output line C2.

The operation of cathode follower 197 by either AND circuit 167 or 196 also energizes the no carry latch, comprising double inverter 213 and cathode follower 214, and thereby causes output lines NC2 to be UP and to remain UP throughout the time that input line NR is UP. In the event that input line NC1, indicating no carry from adder 49 in Fig. 1a, is UP at the time that cathode follower 197 is operated, the cathode follower will have no effect on the second latch because the positive pulse on line NC1 will have operated the second latch.

The storage control circuits of Fig. 12 serve to control the reading of data in storage unit 44 (Fig. 1a) and to accomplish the emission of zeros and nines during various arithmetic operations in the computing system of Figs. 1a and 1b. The pulse developed at output terminal 138 accomplishes the readout of data recorded in storage 44.

For example, the presence of a positive condition on either of the lines NR, AGX and ST8 brings about the operation of OR circuit 225. Similarly, when lines ST5 and 124A are UP simultaneously, AND circuit 227 is caused to go UP for operating OR circuit 225. In any one of these four input conditions the output of inverter 224 is DOWN and the output of inverter 226 is UP to drive cathode follower 186. With input line AP UP at this time, AND circuit 187 is operated to drive parallel connected cathode followers 189 into conductivity, thereby causing output terminal 138 to go UP.

Output line 138 may be brought UP for the purpose of reading data in storage unit 44 when inverter 185 is not operated by preceding control circuits. For example, when input lines DG11 and 67B are UP simultaneously, AND circuit 182 is operated causing a positive pulse to be delivered through an OR circuit to inverter 183. The negative potential at the output of inverter 183 is delivered through cathode follower 184 to the input of inverter 185. This causes the output of inverter 185 to go UP, thereby operating cathode follower 186 for the purpose of developing a positive voltage at output terminal 138. It should be noted that the operation of cathode follower 186 energizes a latch through an OR circuit, inverter 183, cathode follower 184 and inverter 185. So long as this latch is energized, output terminal 138 will be brought UP in accordance with the positive pulses impressed on input line AP (see Fig. 2).

Output terminal 138 may also be brought UP by a positive voltage developed by the circuit of Fig. 13 on line 181. As in the case of AND circuit 182 previously explained, the voltage on line 181 is delivered through an OR circuit to inverter 183 thereby initiating a latch of which inverter 183 forms a part and thus bringing about a positive condition at output terminal 138.

Output terminals 73 and 74 of the storage control circuit in Fig. 12 operate switch 53 in Fig. 1a and the circuits of Figs. 8, 11 and 14 for the purpose of controlling the transmission of data from storage 44 to adder 49. When output terminal 73 is UP, the true value of the data stored is transferred from storage unit 44 to adder 49. When output terminal 74 is UP, the complement value of the data in storage unit 44 is transferred to adder 49.

Output terminal 73 is in an UP condition whenever the latch, represented by double inverter 142 and cathode follower 143, is energized. This occurs whenever OR circuit 152 is operated by either AND circuit 140 or AND circuit 195. In the case of AND circuit 140, its operation is controlled by the presence simultaneously of positive voltages on input lines DG11, 66B and NT. On the other hand, AND circuit 195 is operated by the presence simultaneously of positive voltages on input lines DG11 and 69. When the output of AND circuit 152 is UP, double inverter 142 drives cathode follower 143 into a state of conductivity, causing its output to go UP for setting UP the latch and accomplishing the transmission of the selected true data from storage unit 44 to adder 49.

Output terminal 74 is made to go UP whenever cathode follower 47 becomes conductive. This requires that inverter 146 and its control OR circuit 145 be in a deenergized condition. It will be noted from Fig. 12 that OR circuit 145 is operated at the time intervals in which the pulse distribution chain of Fig. 8 develops output pulses on its lines DG11, DG32 or DGX4.

During the first time interval of operation of the primary chain of Fig. 8, a positive signal is developed on output line DG11 which, in conjunction with the positive signals available on lines 70 and 68B, operates AND circuit 178 and through an OR circuit makes inverter 179 conductive. Cathode follower 180, therefore, cannot be operated and the upper diode of OR circuit 145 delivers the negative voltage to inverter 146, whose positive output then drives cathode follower 47 to cause output terminal 74 to go UP.

In division it is necessary to transfer the complement of the divisor number in storage unit 44 to adder 49 during each operating cycle. Therefore, the DG11 pulse from the primary chain of Fig. 8 energizes a latch, comprising an input OR circuit, inverter 179, cathode follower 180, OR circuit 145, inverter 146 and cathode follower 47. Output line 74 is UP during the time that this latch is energized. However, the latch may be de-energized at time interval DG32 or DGX4 of each operating cycle. At time DG32 the positive pulses on input lines DG32 and 67B operate AND circuit 144, OR circuit 145 and inverter 146, making cathode follower 47 non-conductive and pulling line 74 DOWN. At time interval DGX4 a positive pulse is fed by the primary chain of Fig. 8 to OR circuit 145 to bring output line 74 DOWN in the same way.

During multiplication complements transfer is not required, and output line 74 is always DOWN. The absence of a division indicating pulse on line 68B prevents coincidence at AND circuit 178 and maintains the succeeding complements transfer latch de-energized.

The positive pulse on line DGX4 which causes output line 74 to go DOWN, in the manner explained, also operates inverter 141 in order to de-energize the latch represented by double inverter 142 and cathode follower 143. This has the effect of bringing output terminal 73 DOWN at the end of an operating cycle. The true transfer control latch, comprising double inverter 142 and cathode follower 143, is energized when input line 69, indicating a no carry condition in adder 49, is UP or when the first pulse DG11 arrives from the primary chain during a multiplication operation.

Output terminals 56 and 57 control the emission of zero value pulses and nine value pulses respectively to adder 49. When these output lines are UP, switch 53 in Fig. 1a is directed to pass zero and nine pulses, as the case may be to adder 49, but when they are DOWN such passage is not permitted.

In terms of the circuit of Fig. 12, output terminal 56 is UP only when cathode follower 150 is operated. This occurs when all three input lines of OR circuit 148 are DOWN and the output of inverter 149 is thereby in an UP condition. However, when one of the lines 159, 74a and the line from cathode follower 223 is UP, output terminal 56 is DOWN and the transmission of zero pulses is barred.

It has been stated under what conditions output terminal 74 is caused to be UP. When output terminal 74 is brought UP, its associated line 74a delivers a positive pulse to OR circuit 148 for the purpose of barring the emission of zero pulses at the time that the complement value of the number in storage unit 44 is being transferred to adder 49.

It should be noted at this time that energization of output terminal 56 through OR circuit 148 brings about simultaneously the de-energization of output terminal 57, thereby preventing both these output terminals to be either UP or DOWN simultaneously, except in the case where the condition of output terminals 56 and 57 is controlled by cathode follower 223. When cathode follower 223 produces a positive pulse that is fed to OR circuits 148 and 219, the latter OR circuit will operate inverter 220 to cause cathode follower 221 to be non-conductive and output terminal 57 to be DOWN. The operation of OR circuit 148 has the same contact on inverter 149 and cathode follower 150 to bring output terminal 56 DOWN. However, when cathode follower 223 is not conducting, the output lines 56 and 57 will always be in opposite states.

Cathode follower 223 may be operated when output terminal 73 is UP provided that a positive voltage occurs on input line 181 or positive voltages occur simultaneously on input lines DG11 and 67b. When either of the latter two conditions occur, a latch, comprising inverter 183, cathode follower 184, inverter 185 and cathode follower 186, is formed that causes line 228 to go UP. With both lines 228 and 73 UP, AND circuit 230 is made conductive, operating OR circuit 222 and causing a positive pulse to be developed by cathode follower 223.

Cathode follower 223 may also be made conductive whenever output terminal 74 is UP provided that line 228 is UP also. The positive potentials on these lines operate AND circuit 229 and through OR circuit 222 make cathode follower 223 conductive.

The latch, represented by inverter 183, cathode follower 184, inverter 185 and cathode follower 186, is controlled further by inverter 226 in the following manner. If either input terminal NR, AGX, ST8 input terminals ST5 and 124A are UP simultaneously, OR circuit 225 will be operated. Input lines ST5 and 124a operate OR circuit 225 through AND circuit 227. When OR circuit 225 is UP, inverter 224 has its output side DOWN and inverter 226 has its output side UP. Thus cathode follower 186 and the latch of which it forms a part may be operated for the purpose of controlling the development of positive pulses on output lines 138, 139, 56 and 57. The logical interrelationship of these circuits of Fig. 12 with the other circuits in the disclosed computing system will be subsequently discussed in conjunction with a timing base developed by the primary pulse distribution chains of Fig. 8.

Fig. 13 illustrates the shift control circuits that provide pulses particularly for the operation of the pulse chains of Fig. 10 described above. By selectively applying positive pulses to input terminals 62 and 62A of Fig. 13 it is possible to develop control signals on any one of the output lines a1–a4 and at a corresponding one of the output lines a1–agx. It is thus possible to start the accumulator ring of Fig. 10 at any stage while the primary ring of Fig. 8 begins at the first stage. In this way any desired relationship of pulses from the primary and accumulator rings may be programmed.

Assuming that an input pulse is applied at input terminal 62A, it may be noted that the top OR circuit and the second from the bottom OR circuit are operated. Operation of the top OR circuit delivers a positive pulse directly to the control grid of the corresponding circuit that develops an output pulse on line a2. Since the cathodes of the circuits 116 are connected directly to line 82, with this line in a negative condition, only circuit 116 that produces the a2 pulse is operated. In the same way, the DOWN condition on line 83 brings about the operation of the circuit associated with output line ag4 to develop a positive pulse on said output line. Inverters 118 produce a positive pulse in their associated circuits 84 only when there is an absence of a positive pulse on all input lines 62, 62A and 68C. The positive pulse on line 68C serves to develop positive pulses on output lines a4 and ag2.

It has been said that select ones of the inverters 84 and 116 are operated whenever lines 82 and 83 are DOWN. This occurs when no positive pulse is applied to OR circuit 81 and whenever cathode followers 202 are not conducting. This condition occurs when a positive pulse is applied on line DGX4 by the primary chain of Fig. 8 at the time that line T is UP. Line T is presumed to be UP during the preliminary or pre-operating cycle of the primary chain of Fig. 8, as will be subsequently explained. The output of AND circuit 199 is UP, the output of double inverter 200 is UP and the positive output of cathode follower 201 along with the positive pulse on line BP (see Fig. 2) operates AND circuit 78. The latter makes inverter 79 conductive which brings about the de-energization of the latch, comprising double inverter 117 and cathode follower 80. The negative output developed by cathode follower 80 thereby permits the negative pulse on line NR to be fed to the joined control grids of cathode followers 202, which place lines 82 and 83 in a DOWN condition.

Prior to the development of a positive pulse on input line DGX4, the latch, represented by inverter 117 and cathode follower 80 is in an energized condition as a result of a positive pulse applied on input line AP. This pulse is fed through an OR circuit to the control grid of the left triode of double inverter 117, thereby driving cathode follower 80 into a state of conductivity. Once this latch is formed, the positive pulse is continuously delivered through OR circuit 81 to cathode followers 202, which maintain lines 82 and 83 UP until the next positive pulse on line DGX4 is received at the end of each cycle of primary chain operation.

The pulse received from the primary distribution chain on line DGX4 also serves to develop a positive pulse on output line 181. This pulse is delivered to the circuit of Fig. 12 where it serves to develop a pulse for reading out information from matrix storage 44 of Fig. 1a.

Fig. 14 illustrates the circuits which control operations during multiplication and division. In the case of multiplication input hub 64 is pulsed positively to initiate a multiplication operation. At a time interval determined by a positive condition on input line T, AND circuit 76 is operated and through its associated OR circuit brings about the energization of a latch, comprising double inverter 75 and cathode follower 77. Once this latch is energized at the start of a multiplication operation, it stays in this condition until a negative voltage arrives through inverter 164 at a subsequent time interval, as will be explained later. This latch circuit seres to control the operation of all the control circuits which enter into the multiplication operation.

The positive voltage developed by cathode follower 77 causes output lines 66a and 66b to go UP. The positive voltage on line 66a is fed to the circuit of Fig. 11 where it permits a no carry signal to be developed and a carry signal to be suppressed under certain conditions. The positive voltage on line 66b is delivered to the storage control circuit of Fig. 12, where it serves to develop a positive signal, under certain conditions, for the purpose of transferring the multiplicand from storage unit 44 to adder 49.

The positive voltage developed by cathode follower 77 is also delivered through OR circuit 104 to cathode follower 103 which develops positive voltage on output lines 67a–67d. The positive voltage on line 67a is delivered to the AND circuit 37 of Fig. 8 for the purpose of preventing the stepping along of chain d1–d4 under certain conditions. The positive voltage on line 67b is delivered to the storage control circuit of Fig. 12 where it serves to control the development of pulses that control the transfer of data from storage unit 44 to adder 49. The positive voltage on line 67c is delivered to AND circuit 105 of Fig. 10 where it serves to reset pulse chains a1–a4 and ag1–agx when a positive voltage is developed simultaneously on line AGX. The positive voltage on line 67d is fed to AND circuit 196 of Fig. 11 where it serves to develop a no carry signal and to suppress a carry signal received from adder 49 of Fig. 1a, whenever a positive pulse exists simultaneously on input lines DG32 and 73a.

At the same time that lines 67 in Fig. 14 are UP, the output line 166 is DOWN. The positive voltage provided by cathode follower 103 makes inverter 168 conductive, thereby preventing cathode follower 169 from operating and output line 166 from going UP. Throughout the multiplication operation output line 166 will be DOWN. This line only goes UP upon the completion of either a multiplication or division operation, inasmuch as the function of the signal on line 166 is to initiate a new operational cycle.

For a division operation, a positive pulse is applied to input hub 65 of Fig. 14. At a time determined by the presence of a positive voltage on input line T of Fig. 14, AND circuit 170 is operated and through its associated OR circuit accomplishes the energization of the division control latch made up of double inverter 171, cathode follower 172 and the input OR circuit. Throughout the division operation, this latch will remain energized and produce a positive voltage for operating the division control circuits.

The positive voltage developed by cathode follower 72 is made available to output lines 68a–68c. The positive voltage on line 68a is delivered to AND circuit 38 of Fig. 8 where it permits chain group dgx–dg4 to be stepped along at time interval DG43. The positive voltage on line 68b is delivered to AND circuit 178 of Fig. 12, where it serves to develop a positive pulse on output line 74 for transferring the complement value of the divisor in matrix storage 44 to adder 49. The positive voltage on output line 68c is delivered through two OR circuits in Fig. 13 to lines 191 and 192 for the purpose of raising UP output lines a4 and ag2.

The positive voltage developed by cathode follower 172 throughout the division operation is also made available through OR circuit 104 and cathode follower 103 to output lines 67a–67d, which perform the functions described above in the case of multiplication. As in multiplication, the positive voltage developed by cathode follower 103 makes inverter 168 conductive and causes cathode follower 169 to bring output line 166 down.

The end of a division operation is sensed by positive pulses occurring simultaneously on lines DG32, AG3, A2, 73C, BP and 68E in Fig. 14. This condition operates AND circuit 198 and through an OR circuit makes cathode follower 162 conductive. Output line 71 is thereby caused to go UP, preventing chain group d1–d4 of Fig. 8 from being stepped along.

As soon as cathode follower 162 is made non-conductive, the output of inverter 163 is UP. This causes inverter 164a to bring its output DOWN, thereby terminating the operation of division latch, comprising double inverter 171 and cathode follower 172. The de-energization of this division latch brings DOWN output lines 68a–68c and lines 67a–67d at the same time that it causes output line 166 to go UP.

The de-energization of cathode follower 162 upon the termination of coincidence at the input of AND circuit 198 causes the input of inverter 165 to go DOWN and output line 218 to go UP, at the same time that output line 166 goes UP. The positive pulse on line 218 may be fed to a program device (not shown) for the purpose of beginning a new operation cycle.

The circuit of Fig. 14 is also capable of operating switch 53 of Fig. 1a for the purpose of transferring the true or complement value of the number in matrix storage 44 to adder 49 in the following manner. The presence of a positive pulse on line DG2 operates OR circuit 231, causing inverter 176 to go DOWN and thereby preventing cathode follower 177 from conducting. In this case output line 69 is DOWN and switch 53 is prevented from being operated at a time interval determined by a positive pulse on line DG11 (Fig. 12). With line 69 DOWN, the output of inverter 174 is UP driving cathode follower 175 into conduction and making line 70 to go UP. Reference to Fig. 12 will show that when line 70 is UP, line 74 of Fig. 12 is also UP, thereby operating switch 53 of Fig. 1a in a manner to transfer the complement value of the divisor in storage unit 44 to adder 49. So long as output line 70 is UP, output line 69 will be DOWN because of latch, comprising cathode follower 175, OR circuit 231, inverter 176, cathode follower 177 and inverter 174, formed by positive pulse on line 70.

The reverse condition of outputlines 69 and 70 may be realized by the development of coincidence at the input of AND circuit 173. This occurs during the course of a division operation when adder 49 of Fig. 1a develops a no carry signal. With positive voltages on input lines DG3, D1, NC1, and 68D AND circuit 173 is operated and through an associate OR circuit makes inverter 174 conductive, and cathode follower 175 non-conductive. This causes output line 70 to go DOWN, thereby preventing the complementary value of the number in storage unit 44 from being read out into adder 49 at the time when a positive pulse is being developed on line DG11 by the primary chain of Fig. 8. At the same time that output line 70 is DOWN, output line 69 is UP to permit the true value of the number in storage unit 44 to be transferred to adder 49 at a time determined by a positive pulse on line DG11 (see Fig. 12).

Output line 72 of Fig. 14, like output line 71, serves to prevent the primary chain of Fig. 8 from being stepped along and, as a result, to develop a changed phase relationship between the primary ring of Fig. 8 and the accumulator ring of Fig. 10. This occurs during multiplication when adder 49 (Fig. 1a) indicates that the multiplier is a zero. In this case, input lines L1, 66d, DG2 and BP are UP simultaneously, operating AND circuit 151 and cathode follower 160 to bring UP output line 72.

In the case where the last digit of the multiplier is zero, input line AGX and output line 72 will be UP simultaneously. The output of AND circuit 161 is UP to operate cathode follower 162 in a manner to terminate the multiplication control latch, comprising double inverter 75, cathode follower 77 and an input OR circuit, and therefore to terminate the particular multiplication operation.

Output terminal 159 of Fig. 14 is UP during multiplication at time interval DG31 of an operational cycle. The coincidence at AND circuit 153 operates inverters 154 and 155 in a manner to energize an output latch, comprising double inverter 156, cathode follower 158 and AND circuit 157. The latch is de-energized and output line 159 is brought DOWN when input line NR is DOWN. The positive voltage on line 159 controls the emission of a digit 9 to adder 49.

*System operation*

Multiplication is initiated by applying a positive pulse to input hub 64 of Fig. 14. With reference to Fig. 15, which illustrates a sequence of pulse formation by the rings of Figs. 8, 9 and 10, it may be noted that multiplication is not initiated during the first 17 point cycle, as explained below.

Assuming that a positive pulse is received at input hub 64 of Fig. 14, AND circuit 76 is operated and the multiplication control latch comprising, double inverter 75, cathode follower 77 and an associated input OR circuit, is energized. Input line T is UP throughout the period DGX2–DGX4 shown at the top of Fig. 15. With the multiplication control latch energized, output lines 66 and 67 in Fig. 14 are UP and output line 166 is DOWN. The last-mentioned output line is only UP when a program change is required.

A transfer of data from storage unit 44 is prevented during the first cycle. Although input line 66b in Fig. 12 is UP at this time, input line NT is DOWN and remains DOWN until the start of the next 17 point cycle; therefore AND circuit 140 cannot be operated to bring output line 73 UP. Whenever line 73 is DOWN, data transfer from storage unit 44 to adder 49 is prevented. Similarly, output line 74 is DOWN since the input pulse on line DGX4 operated inverter 146 and therefore made cathode follower 47 non-conductive. Both output lines 73 and 74 will continue to remain DOWN until the start of the second cycle or first operation cycle at which time a positive pulse is made available on line DG11 from the primary ring of Fig. 8.

At time interval DG32 of the first non-operation cycle a test is made to see if the position of the accumulator which happens to be scanned is equal to 0. It is assumed during the course of this explanation that the multiplicand in storage unit 44 occurs in any location, and the multiplier occurs in positions 10–17 in accumulator 50. At time interval DG32 of the first non-operation cycle, the unit digit in position 10 of the accumulator is read into adder 49 by the accumulator ring pulses on lines AG3 and A2 of Fig. 10. If adder 49 determines that a zero has been read out of the accumulator 50 its output line L1 will be UP and with the positive pulse available on line DG32 will operate AND circuit 151 and raise output line 72 UP. In this condition, the latter line prevents the primary chain of Fig. 8 from being stepped along. This brings about an automatic shift, inasmuch as it changes the phase relationship between the primary ring of Fig. 8 and the accumulator ring of Fig. 10. Of course, an absence of a 0 digit in the unit order of the multiplier will keep line 72 of Fig. 14 DOWN and allow the primary and accumulator rings to proceed normally through the next operation cycle.

As shown in the upper portion of Fig. 15, the first cycle is 17 points long, that is from time interval DG11 through time interval DGX4. The reduction of 3 cycle points in the primary ring of Fig. 8 is accomplished as follows. At time interval DG44 AND circuit 37 of Fig. 8 is made operative which causes control line D of primary chain group d1–d4 to be UP. This bars the group from proceeding to stage d1. At the same time the pulse on line D4 operates AND circuit 22, which ultimately causes control line DG of chain dgx–dg4 to go DOWN, thus permitting the negative pulse on line NR to step this chain from dg4 to dgx. In this way the pulses on lines DGX1, DGX2 and DGX3 are suppressed, and a 17 point ring results.

At time interval DGX4 of the first cycle the storage ring of Fig. 9 and the accumulator ring of Fig. 10 are reset in the following manner. The pulse on line DGX4 that is fed to the storage ring makes AND circuit 119 operative and, as previously explained, brings about the operation of double inverter 122 of stage st1 in a manner to make this stage alone operative. The positive pulse on line DGX4 that is fed to the AND circuit 199 (Fig. 13) causes positive signals to be developed at output lines a1 and ag1. These signals are then entered into the accumulator ring of Fig. 10 for the purpose of resetting said ring. Therefore, at the beginning of the first transfer cycle, as shown in Fig. 15, the primary, accumulator and storage rings will begin operating in correct phase relationship from the reset condition.

At the end of the first 17 point cycle, input line NT of Fig. 12 goes UP and along with a positive pulse on input line DG11 operates AND circuit 140 and causes output line 73 to go UP. Thus data in storage unit 44 that is selected by the storage ring of Fig. 9 is permitted to be transferred by switch 53 to adder 49 (Fig. 1a)

The positive pulse on line DG11 in Fig. 12 also operates AND circuit 183 which eventually causes output terminal 138 to go UP for the purpose of reading and regenerating data in storage unit 44. Output line 56 in Fig. 12 also goes UP at this time for the purpose of controlling the emission of digit 0 pulses to adder 49.

At time interval DG32 of the second cycle or first operation cycle shown in Fig. 15, a 9 is entered into the adder 49 (Fig. 1a) from a conventional 9's generator (which is not shown) as a result of output line 159 going UP. This 9 added to the digit of position 10 of the accumulator serves to reduce by 1 the unit digit standing in position 10 of the accumulator, the carry resulting from the entry of the 9 being suppressed in the following manner. The pulse on line DG32 operates AND circuit 196 in Fig. 11, thereby causing output line C2 to be DOWN and output line NC2 to be UP. It has already been stated that this output condition of Fig. 11 indicates that a carry pulse is suppressed.

The storage ring of Fig. 9 continues to read out sequentially the 3, 5 or 8 digits from storage unit 44. Similarly the accumulator ring of Fig. 10 continues to control the operation of accumulator 50 (Fig. 1b). During each DG32 time interval (see Fig. 15) a 9 is added to the accumulator value to reduce by 1 the digit standing in each succeeding order beginning with position 10 and proceeding to position 17. As previously stated, the presence of a 0 in any order of the accumulator causes the primary chain in Fig. 8 to be stepped one point, thereby shifting the relationship between the pulses of the primary chain of Fig. 8 and the accumulator chain of Fig. 10. In the middle section of Fig 15, it is seen that a 0 has been detected as a result of the addition of a 9, thereby causing the primary ring of Fig. 8 to have its output condition at time interval DG32 repeated. This develops a new relationship between the primary and accumulator chains wherein the pulse DG32 of the primary ring now corresponds to the AG33 pulse of the accumulator ring.

In the lowermost section of Fig 15 it is seen that the addition of a 9 develops a 0 condition, which condition continues to exist in a number of succeeding orders. It will be noted that the primary chain is delayed 7 points during which a new relationship between the primary and accumulator chains is developed. During this delay or repetition of the DG32 pulse by the primary chain the carries are suppressed. Shown in Fig 15, the last 0 is sensed in the accumulator when the phase relationship between the primary and accumulator rings is such that the former is emitting DG32 pulses at the time that the latter has completed its 17 point final cycle by emitting AGX4 pulses.

The AGX pulse of the accumulator ring of Fig. 10 examines the last digit in the accumulator to be a 0. When such occurs, AND circuit 161 of Fig. 14 is operated causing output terminal 71 to go UP, and the pulse on this output terminal prevents the primary ring of Fig. 8 from being stepped along. When this output terminal is UP, the multiplication latch comprising double inverter 75 and cathode follower 77 is de-energized and output lines 66 and 67 are DOWN. This brings about the stopping of the multiplication circuit, although the primary ring continues to step along through the interval DGX4 of the last operating cycle.

Referring to Fig. 15, it will be seen that the multiplication ends at time interval DG32, thereby providing sufficient time (8 cycle points) before the termination of the operating cycle. In this way no extra delay is needed for program advancing.

An examination will now be made of the computing system according to the invention in the light of its application to division operations. Particular reference is to be made to the timing charts of Figs. 16a and 16b, which illustrate the hypothetical sequence of operation and relationship between the pulse distribution chains of Figs. 8, 9 and 10. It is assumed in our example that the divisor is located in some area of storage unit 44 and the dividend is found in positions 8–17 of accumulator 50.

To accomplish a division operation it is merely necessary to have a positive pulse applied at input hub 65 of Fig. 14. In such a case, AND circuit 170 of Fig. 14 is UP inasmuch as input line T is also UP during the first operation cycle of the computer. Operation of AND circuit 170 energizes the division control latch, comprising double inverter 171, cathode follower 172 and the input OR circuit, which is maintained energized throughout the division process, causing output lines 67 and 68 of Fig. 14 to be UP. Output line 166 is DOWN throughout the division operation and is brought UP only upon the termination of division.

Figure 16A:
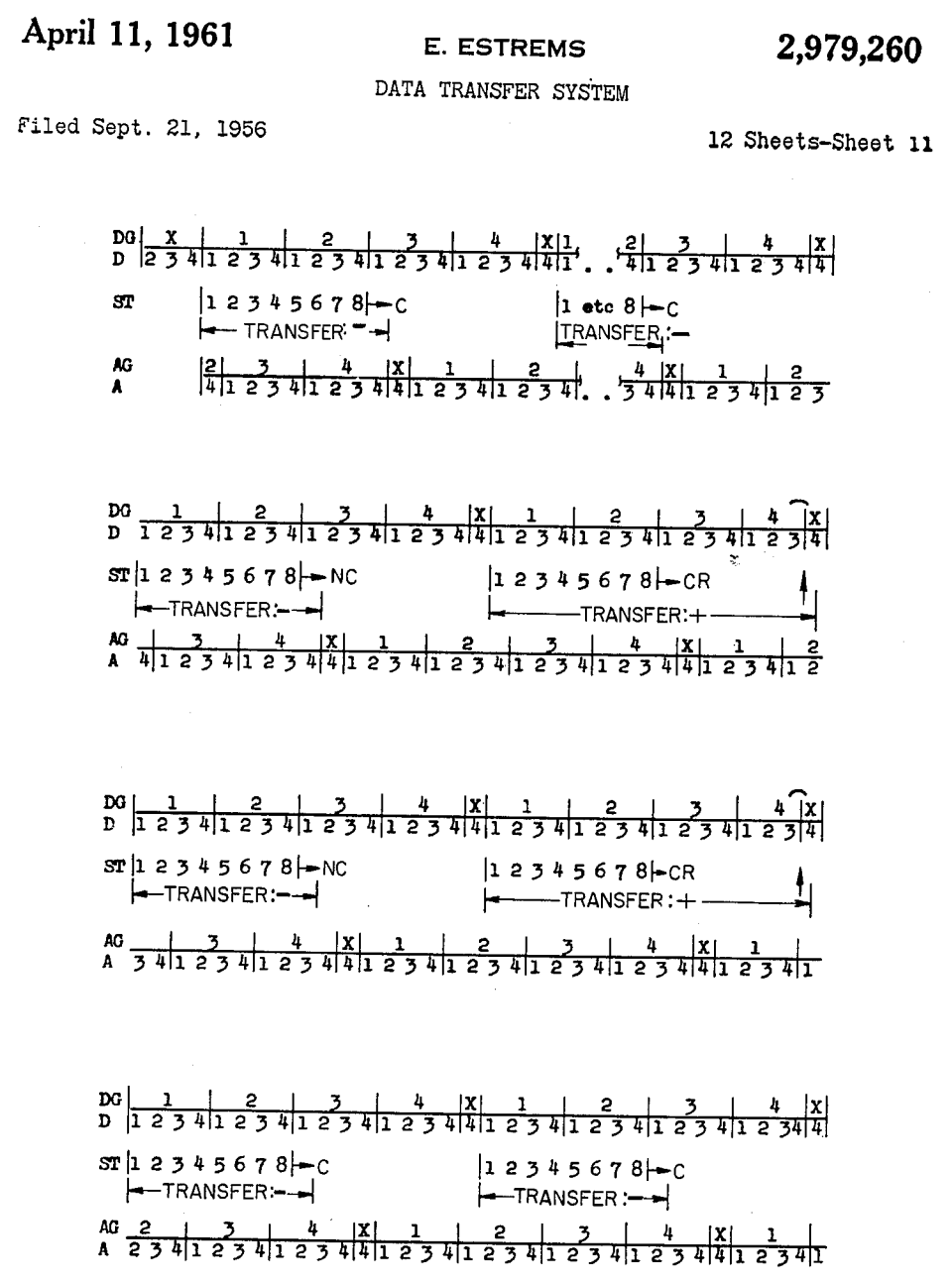
Figure 16B:
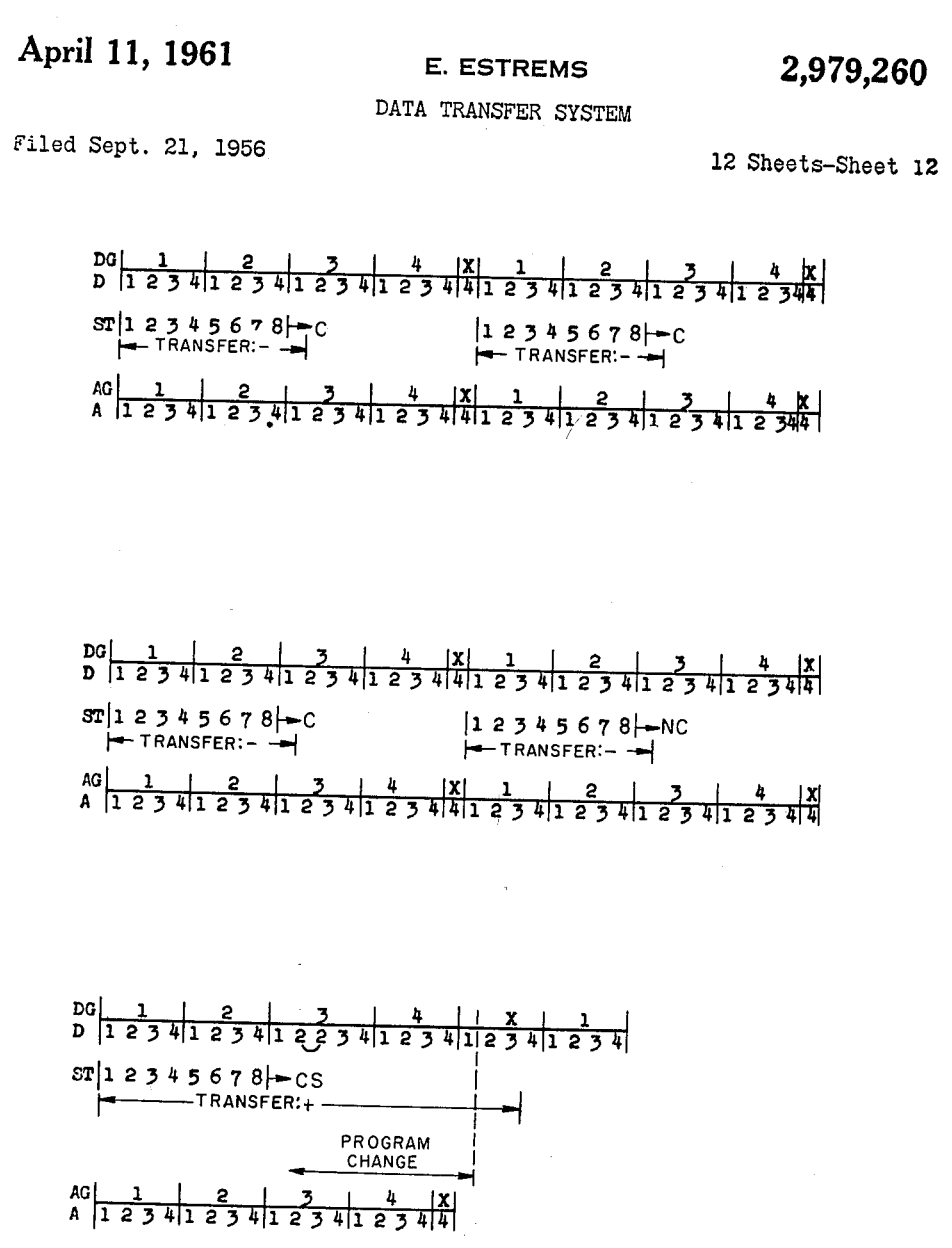

Reference to Fig. 16a will show that during the first operation cycle control pulses are developed by the three pulse distribution chains in proper relationship, with the storage control pulse distribution chain of Fig. 9 reading out eight digits sequentially from storage unit 44 and the accumulator control pulse distribution chain of Fig. 10 reading out from the accumulator starting at digit position 8. Digit position 8 is represented by pulses developed simultaneously by chain group stage ag2 and chain group stage a4 of the accumulator control pulse distribution chain of Fig. 10. This is accomplished by the positive pulse on input line 68c of Fig. 13 that makes lines a4 and ag2 go UP soon after the division control latch of Fig. 14 is energized. Referring to Fig. 10, it may be seen that when these two lines are UP positive pulses are developed on output lines A4 and AG2 at the start of the transfer operation. Of course, it must be understood that the pulse distribution chain of Fig. 10 can begin to read out from the accumulator at any position simply by connecting input line 68c to any other input OR circuit combination illustrated in Fig. 13.

In division it is necessary to transfer the 9's complement of the divisor in storage unit 44 to adder 49. Referring specifically to Fig. 12, it may be seen that at time interval DG11 the positive pulses at input lines 70 and 68b operate AND circuit 178, which energizes a latch that will maintain output line 74 in a positive condition until time interval DG32 of the same operation cycle. During the time that output line 74 is UP, the 9's complement of the divisor is transferred into the adder, inasmuch as output line 138 of Fig. 14, which permit readout from storage unit 44, are also UP at this time. Whenever output line 74 is UP, output line 56 is necessarily DOWN to prevent the transmission of zeros. Similarly output line 57, which controls 9's emission, is DOWN during the transfer of the divisor.

During each succeeding point of each operation cycle the complement of the next higher digit of the divisor is entered into the adder 49 until transfer of the divisor during a particular operation cycle is terminated. At such time input line ST8 in Fig. 12 is caused to go UP, thereby bringing line 57 UP also. The positive pulse on this output line permits a 9 to be entered into the adder. If a carry occurs at this time, input line C1 in Fig. 11 goes UP and input line NC1 goes DOWN. Referring to Fig. 14, it may be seen that when input line NC1 is DOWN, output line 70 is UP. With output line 70 UP, as already stated, output line 74 in Fig. 12 also is UP to allow the transfer to complementary form of the digits in storage unit 44.

Output line 70 remains UP whenever it is necessary to maintain the conditions in a succeeding operation cycle similar to those which prevailed during the preceding cycle. In this way the complements transfer of the divisor is performed in the same positions of the dividend as in the preceding cycle. The detection of a second carry as shown at the top of Fig. 16a, allows the last or 17th position of the accumulator to receive an additional unit for registering a 2 in this position.

Further reference to Fig. 16a will show that the emission of a digit 9 during the third operation cycle does not initiate a carry. In such a case, AND circuit 173 is operated at time interval DG31 to bring output line 70 DOWN and output line 69 UP. Referring to Fig. 12, it is seen that when input line 70 is DOWN, output line 74 is also DOWN to prevent a transfer of the divisor complement to adder 49. At the same time interval DG11 the positive pulse on input line 69 operates AND circuit 195 and causes output terminal 73 to go UP for the purpose of transferring the true value of the divisor in storage unit 44 to adder 49. It should be noted that during the time output line 73 in Fig. 12 is UP, both output lines 56 and 57 are DOWN to prevent the transfer of zeros and nines to adder 49.

The purpose of the true transfer during the fourth operation cycle is to reset the partial remainder obtained at the end of the second operation cycle because the subtraction during the third operation cycle produced a negative remainder. It is thus necessary to shift to the calculation of the second quotient digit in order to add the divisor to this remainder. The shift is accomplished in the following manner. With output line 73 in Fig. 12 UP, AND circuit 38 in Fig. 8 is operated at time interval DG43 for the purpose of canceling pule DG44, as already explained. This means that at the beginning of the fifth operation cycle the primary distribution chain of Fig. 8 will develop a DG11 pulse at the time that the accumulator pulse distribution chain of Fig. 10 is developing an AG23 pulse. It will be noted that in the prior four cycles the AG24 pulse corresponded to the DG11 pulse. The complement of the lowest digit in the divisor will now be added to the second order digit of the dividend in position 9. The computing system now proceeds to the calculation of the second quotient digit.

Reference to Fig. 16a will show that during the fifth operation cycle again no carry is developed during a transfer of a digit 9 at time interval DG11 to adder 49. This means that during the sixth operation cycle, like the fourth previously explained, complementary transfer of the divisor to the adder 49 is canceled and instead the true value of the devisor is made available to adder 49 again. Output line 56 in Fig. 12 is caused to go UP by a positive pulse on input line ST8 thereby permitting the transfer of zeros to adder 49. The shift takes place again during the sixth operation cycle so that at the beginning of the seventh operation cycle the pulse AG22 of the accumulator pulse distribution chain of Fig. 10 corresponds to pulse DG11 of the primary chain of Fig. 8. Pulse AG22 brings about the readout of the third order digit in position 10 of the accumulator.

Reference to Fig. 16a will show that a carry condition is developed during the seventh, eighth, ninth, tenth and eleventh operation cycles. At the twelfth operation cycle a no carry condition is again detected. During the succeeding or last operation cycle, it is determined that the absence of a carry has occurred at the time when the primary chain of Fig. 8 is developing a DG32 pulse and the accumulator control chain of Fig. 10 is developing an AG32 pulse. Since output line 73 of Fig. 12 is UP at this time, it will be noted by reference to Fig. 14 that AND circuit 198 is operated for the purpose of terminating the division operation. The positive pulse on line 71 of Fig. 14 is made available to the primary chain of Fig. 8, repeating pulse DG32 and thereby permitting the primary chain of Fig. 8 and the accumulator control chain of Fig. 10 to terminate the last operation cycle in a manner to permit both chains to begin the first cycle in the succeeding programmed series of cycles at their respective starting points.

While there have been shown and described and pointed out the fundamental novel features of the invention is applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A data transfer network in an electronic computing system having a first means for storing a first factor, a second means for storing a second factor and adding means for operating upon said two factors, comprising means for selecting one of a plurality of groups of digits forming the first factor in said first storage means for transfer to said adding means during an operation cycle, means for selecting any ordered number of a predetermined quantity of digits forming said second factor in said second storage means for transfer to said adding means during the same operation cycle, and flexibly operating means controlled by control signals developed during each operating cycle of said computer and capable of developing an operation cycle of variable length for controlling the operation of both said selecting means.

2. The invention according to claim 1 in which the first factor selecting means is operated to produce a sequence of three, five or eight output pulses that are delivered to said first factor storage means for the purpose of reading out the corresponding number of digits from said storage means and in which the second factor selecting means produces a predetermined number of electric pulses for selecting a sequential number of digits starting in any location of the accumulator for transfer to said adding means.

3. The invention according to claim 2 in which said flexibly operating means initiates and resets the operation of said first and second factor selecting means, with the initial phase relationship between said first factor selecting means and second factor selecting means being determined by pulses selectively applied by said second factor selecting control means and the subsequent phase relationship between the said two selecting means being determined directly by said flexibly operating means.

4. The invention according to claim 3, wherein the second factor selecting means comprises two pulse distribution chains that produce control pulses simultaneously, input coincidence means controlling the operation of said two pulse distribution chains once they are initiated in a selected phase relationship by said second factor selection control means, said input coincidence means permitting one of said two pulse distribution chains to go through its complete counting cycle before the other of said two distribution chains is permitted to be stepped along one additional position, and in which the input coincidence means determines the number of pulses said two pulse distribution chains are to develop prior to being reset.

5. The invention according to claim 3 in which the first factor selecting means comprises two pulse distribution chains having series-connected latch circuits each of which chains being capable of operating independently to develop one of two different groups of sequential electric pulses, or jointly to develop the maximum number of pulses, a source of pulses to be selectively applied, a first input coincidence means operated by said pulse source for initiating the first pulse chain, a second coincidence circuit operated by said pulse source for initiating the second pulse chain, with either of said coincident circuits being operated at the end of a cycle of operation of said flexibly operating means, a third input coincidence means operated by said pulse source upon the completion of a cycle of operation of said first chain after said pulse source had operated said first coincidence means to start said first chain.

6. A data transfer network in an electronic computing system having a first means for storing a first factor, a second means for storing a second factor, an adding means for operating upon said two factors, comprising a first pulse distribution chain capable of developing one of three groups of control pulses and reading out one of three groups of digits from said first factor storage means, a second pulse distribution chain in the form of two simultaneously operating chain groups and capable of developing any selected number of pulses in any relationship with the pulses developed by the first distribution chain for reading out any ordered number of digits from said second storage means and a third pulse distribution chain for controlling the synchronous operation of said first and second pulse distribution chains within an operating cycle developed by said third pulse distribution chain, with said pulse distribution chain being reset by said third pulse distribution chain and said second pulse distribution chain being reset automatically by the pulses provided by both its chain groups upon the completion of a complete cycle of operation of said groups.

7. The invention according to claim 6 wherein said third pulse distribution chain develops a predetermined regular number of electric pulses during each operation cycle under its own control any any increased or decreased number of electric pulses under the control of control pulses developed during each arithmetic operation by the computing system.

8. In an electronic computing system, a primary pulse distribution chain for controlling the transfer of data between the various arithmetic circuits and for accomplishing the shifting of such data during the actual arithmetic operation, said chain having two closed rings of different lengths for producing simultaneously two distinct electric pulses wherein the one chain group produces a plurality of pulses for each pulse developed by the other chain group, and an input control means for controlling the operation of said two chain groups and being controlled by said two chain groups in a predetermined sequence, with said input control means also being controlled by control pulses developed during the arithmetic operation of said computing system for varying the number of electric pulses and the relationship of the pulses developed by the two chain groups during any operation cycle.

9. A pulse distribution chain for a computing system, comprising a first group of serially connected pulse forming latch circuits, a second group of serially connected pulse forming latch circuits, and input coincidence means directly connected to the output of certain ones of said first and second pulse forming latch circuits to allow each of said chain groups to control the resetting of the other, with said input coincidence means being further connected to the computing system in a manner to determine the number of electric pulses or cycle points that said pulse distribution chain is to develop in any computing operation cycle before said pulse groups reset said pulse distribution chain to commence the next operating cycle.

10. An electronic pulse distribution chain comprising a first chain group of a predetermined number of serially connected pulse forming circuits, a second chain group of a different number of serially connected pulse forming circuits, a first input coincidence means connected directly to said first chain group, and a second input coincidence means connected directly to said second chain group, said first input coincidence means connected directly to said first and second chain groups and being operated by said first and second chain groups to reset said first chain group when both said two chain groups have completed their independent cycles of operation simultaneously and said second coincidence means connected directly to said first chain group and being operated by said first chain group to set up the second chain group one position each time said first chain group runs through its full cycle of operation.

11. The invention according to claim 10 comprising a first input latch circuit connected to said first coincidence means, a second input latch circuit connected to said second coincidence means, a source of negative stepping pulses, a source of input control pulses, a first connecting circuit means connecting said first input latch circuit and said source of stepping pulses to the control line of the pulse forming circuits of said first chain group, a second connecting circuit means for connecting the second input latch circuit and said source of stepping pulses with the control line of the pulse forming circuits of said second chain group, each of said control lines connecting the pulse forming circuits in each chain group for stepping said chain group, wherein said first coincidence means controls the operation of said first input latch circuit to control the entry of the stepping pulses through said first connecting circuit means to the control line of said first chain group for the purpose of stepping said first chain group from one position to another position and wherein said second coincidence means controls the operation of said second latch circuit to control the entry of the stepping pulses through said second connecting circuit means to the control line of said second chain group for the purpose of stepping along said second chain group, the operation of said first and second input latch circuits being controlled by certain ones of the input control pulses directly and by different ones of said control pulses through said coincidence means.

12. The invention according to claim 11 wherein the energization of said first and second latch circuits prevents the normal stepping of each respective chain group by maintaining the control lines in a positive condition and determines the number of pulses that are developed by each chain group during any operation cycle prior to resetting.

13. The invention according to claim 12 wherein said first latch circuit is energized by the operation of said first coincidence means for the purpose of developing a positive voltage on the control line of said first chain group to prevent said group from continuing with its normal stepping operation and wherein said second latch circuit is de-energized by the operation of said second coincidence means for the purpose of developing a negative stepping voltage on the control line of said second chain group to allow the normal stepping operation of said second chain group.

14. The invention according to claim 13 wherein said first and second latch circuits control the entry of an independently developed negative stepping pulse simultaneously or singly on said control lines of said first and second chain groups for the purpose of controlling the operation of said two chain groups and determining the number of electric pulses and the relationship of said electric pulses developed by said chain groups.

15. An electronic pulse distribution chain comprising first and second chain groups, a first input pulse means for initiating the simultaneous operation of said chain groups, a second input pulse means for maintaining the simultaneous operation of said chain groups, and an input control means for preventing said second input pulse means from normally operating one or both chain groups for the purpose of developing any number of electric pulses and any relationship between the electric pulses during any operation cycle of said pulse distribution chain.

References Cited in the file of this patent

UNITED STATES PATENTS

| | | |
|---|---|---|
| 2,624,508 | Dickinson | Jan. 6, 1953 |
| 2,766,377 | Frizzell | Oct. 9, 1956 |
| 2,833,920 | Buley | May 6, 1958 |
| 2,840,708 | Sandiford | June 24, 1958 |

FOREIGN PATENTS

| | | |
|---|---|---|
| 1,056,750 | France | Oct. 21, 1953 |
| 1,092,660 | France | Nov. 10, 1954 |
| 709,409 | Great Britain | May 26, 1954 |
| 749,836 | Great Britain | Mar. 30, 1953 |